(12) United States Patent
Leigh et al.

(10) Patent No.: US 10,425,160 B2
(45) Date of Patent: Sep. 24, 2019

(54) OPTICAL LINKS WITH ELASTIC BANDWIDTH AND RESILIENCY FOR DYNAMICALLY ADAPTABLE END-TO-END BANDWIDTH AND LINK RELIABILITY

(71) Applicant: Hewlett Packard Enterprise Development LP, Houston, TX (US)

(72) Inventors: Kevin Leigh, Houston, TX (US); David Olson, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/065,881

(22) PCT Filed: Jan. 29, 2016

(86) PCT No.: PCT/US2016/015732
§ 371 (c)(1),
(2) Date: Jun. 25, 2018

(87) PCT Pub. No.: WO2017/131762
PCT Pub. Date: Aug. 3, 2017

(65) Prior Publication Data
US 2018/0375577 A1    Dec. 27, 2018

(51) Int. Cl.
*H04J 14/02* (2006.01)
*H04B 10/25* (2013.01)
(Continued)

(52) U.S. Cl.
CPC ............. *H04B 10/25* (2013.01); *H04B 10/00* (2013.01); *H04B 10/07* (2013.01); *H04B 10/27* (2013.01);
(Continued)

(58) Field of Classification Search
CPC .................................................. H04J 14/0227
See application file for complete search history.

(56) References Cited

U.S. PATENT DOCUMENTS

| 6,535,313 B1 * | 3/2003 | Fatehi .................. H04J 14/0227 |
| | | 398/101 |
| 2008/0044141 A1 | 2/2008 | Willis |
| (Continued) | | |

OTHER PUBLICATIONS

"High Density Multi-lane Optical Transceiver Circuit for High-capacity Inter-processor Data Transmissions," Fujitsu, Feb. 24, 2015, <http://phys.org/news/2015-02-high-density-multi-lane-optical-trasceiver.html>.

(Continued)

*Primary Examiner* — Shi K Li
(74) *Attorney, Agent, or Firm* — Sheppard Mullin Richter & Hampton LLP

(57) ABSTRACT

Example methods and apparatus to implement an electrical/optical transceiver to facilitate data transfer are disclosed. An example apparatus includes an electrical transceiver lane to transfer data at a first bandwidth over an electrical link. The example apparatus also includes a plurality of optical transceiver sub-lanes to transfer data over an optical link. The example apparatus also includes a lane switch to dynamically map the electrical transceiver lane to the plurality of optical transceiver sub-lanes based on an analysis of the first bandwidth and the plurality of optical transceiver sub-lanes to accommodate the first bandwidth with at least a subset of the plurality of optical transceiver sub-lanes to transfer data between the electrical link and the optical link.

12 Claims, 16 Drawing Sheets

(51) Int. Cl.
*H04Q 11/00* (2006.01)
*H04B 10/27* (2013.01)
*H04B 10/40* (2013.01)
*H04Q 11/04* (2006.01)
*H04B 10/00* (2013.01)
*H04B 10/07* (2013.01)

(52) U.S. Cl.
CPC ............ *H04B 10/40* (2013.01); *H04Q 11/00* (2013.01); *H04Q 11/04* (2013.01)

(56) References Cited

U.S. PATENT DOCUMENTS

| | | |
|---|---|---|
| 2009/0196283 A1 | 8/2009 | Kim |
| 2010/0061726 A1 | 3/2010 | Barbarossa |
| 2013/0308944 A1 | 11/2013 | Schwetman, Jr. |
| 2014/0016637 A1 | 1/2014 | Masood |
| 2014/0348512 A1 | 11/2014 | Chaahoub |
| 2015/0071632 A1 | 3/2015 | Koka |
| 2015/0155963 A1 | 6/2015 | Tang |
| 2017/0093484 A1* | 3/2017 | Schmidt ................. H04B 10/03 |

OTHER PUBLICATIONS

PCT International Search report and Written Opinion, dated Sep. 12, 2016, PCT/US2016/015732, 9 pages.

* cited by examiner

OPTICAL LINKS WITH ELASTIC BANDWIDTH AND RESILIENCY FOR DYNAMICALLY ADAPTABLE END-TO-END BANDWIDTH AND LINK RELIABILITY

BACKGROUND

An optical transceiver is a device that transmits and receives data using electrical wire or traces on one side and transmits and receives data using optical waveguide or optical fiber on the other side. Optical transceiver systems, such as optical transmitters and optical receivers, can be implemented for electrical to optical signal conversion and optical to electrical signal conversion. On a printed circuit board (PCB), an optical transceiver can be electrically coupled to an application specific integrated circuit (ASIC), for example a network interface controller (NIC) ASIC or a network switch ASIC.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Network protocol data rates are increasing at rapid pace. A rate or speed of SerDes (serializer/deserializer) data transmission is available at speeds faster than some optical laser modulation speeds (e.g., 50 Gigabits-per-second (Gbps) electrical lane speed versus 25 Gbps optical lane speed, etc.). Additionally, higher optical lane speeds are predicated on lower optical link budgets (e.g., shorter optical cable lengths and/or fewer optical connector stages, etc.). In addition, some optical links are used in a relatively harsh environment such as an optical backplane, optical link reliability may be affected by channel impairment, including mechanical alignment, dust/contamination, laser component reliability, etc.

For traditional optical transceivers, an electrical lane forms an electrical transmit channel and an electrical receive channel. An optical lane forms an optical transmit channel and an optical receive channel. Using an optical transceiver, an electrical lane signal is converted to an optical lane signal, and an optical lane signal can also be converted to an electrical lane signal.

Figure 1:
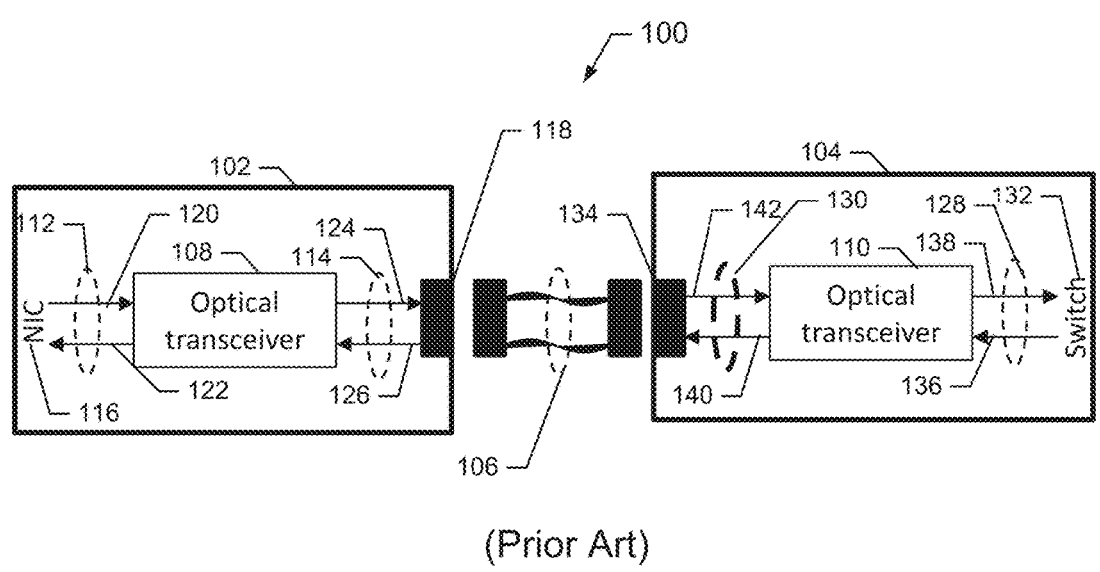
FIG. 1 shows a traditional optical transceiver configuration providing an end-to-end link.

For example, in a traditional optical transceiver configuration providing an end-to-end link 100 such as illustrated in FIG. 1, a first system 102 and a second system 104 connected via an optical cable 106. The first system 102 includes an optical transceiver 108, and the second system 104 includes an optical transceiver 110. The optical transceivers 108, 110 convert between optical and electrical signals for their respective systems 102, 104, In the example first system 102, the optical transceiver 108 uses an electrical lane 112 and an optical lane 114 to convert between an electrical signal sent to and from a device such as a network interface controller (NIC, also referred to as a network interface card, network adapter, local area network (LAN) adapter or physical network interface) 116 and an optical signal sent to and from an optical connector 118. The example electrical lane 112 includes an electrical transmit channel 120 and an electrical receive channel 122. The example optical lane 114 includes an optical transmit channel 124 and an optical receive channel 126.

Similarly, in the example second system 104, the optical transceiver 110 uses an electrical lane 128 and an optical lane 130 to convert between an electrical signal sent to and from a device such as a network switch circuit 132 and an optical signal sent to and from an optical connector 134. The example electrical lane 128 includes an electrical transmit channel 136 and an electrical receive channel 138. The example optical lane 130 includes an optical transmit channel 140 and an optical receive channel 142.

In contrast, certain examples provide an optical transceiver including "sub-channels" for signal transmission. In such examples, an electrical lane of the optical transceiver includes an electrical transmit channel and an electrical receive channel. Additionally, an optical lane of the optical transceiver includes an optical transmit channel formed from a plurality of optical sub-channels and an optical receive channel formed from a plurality of optical sub-channels. However, the optical lane includes a plurality of optical sub-lanes used to form the optical transmit channel and optical receive channel. An optical sub-lane includes an optical transmit sub-channel and an optical receive sub-channel.

Figure 2:
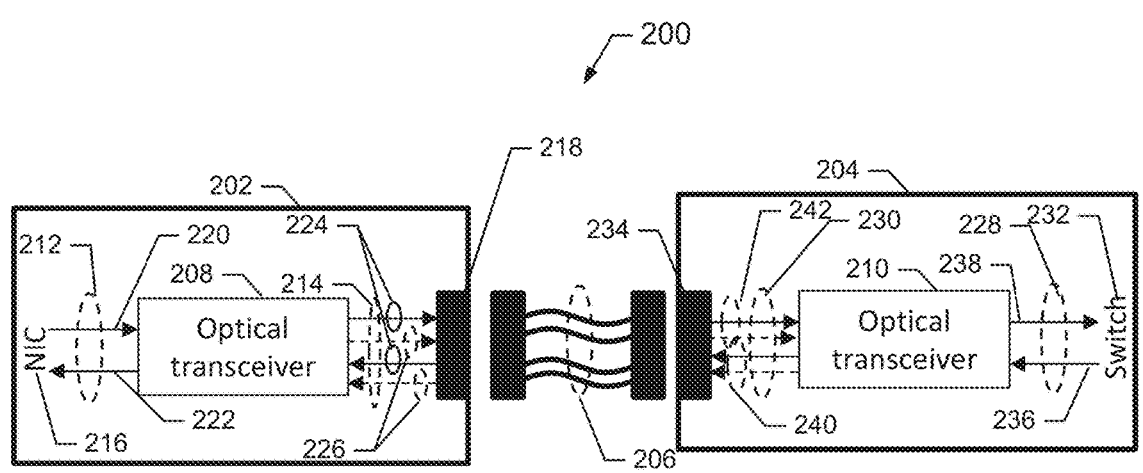
FIG. 2 shows an example end-to-end link system including a first system and a second system connected via an optical cable.

In certain examples, using the sub-channels, an optical transmit channel can be formed from a plurality of optical transmit sub-channels, and an optical receive channel can be formed from a plurality of optical receive sub-channels. For example, as shown in FIG. 2, an end-to-end link system 200 includes a first system 202 and a second system 204 connected via an optical cable 206. The first system 202 includes an optical transceiver 208, and the second system 204 includes an optical transceiver 210, The optical transceivers 208, 210 convert between optical and electrical signals for their respective systems 202, 204.

In the example first system 202, the optical transceiver 208 uses an electrical lane 212 and an optical lane 214 to convert between an electrical signal sent to and from a device such as a network interface controller (NIC) 216 and an optical signal sent to and from an optical connector 218. The example electrical lane 212 includes an electrical transmit channel 220 and an electrical receive channel 222. The example optical lane 214 includes a first optical sub-lane 224 and a second optical sub-lane 226.

Similarly, in the example second system 204, the optical transceiver 210 uses an electrical lane 228 and an optical lane 230 to convert between an electrical signal sent to and from a device such as a network switch 232 and an optical signal sent to and from an optical connector 234. The example electrical lane 228 includes an electrical transmit channel 236 and an electrical receive channel 238. The example optical lane 230 includes a plurality of optical transmit sub-channels 240 and a plurality of optical receive sub-channels 242.

As shown in the example of FIG. 2, the optical cable 206 connecting the first system 202 and the second system 204 includes a plurality of optical sub-lanes in the optical cable 206. The example end-to-end link 200 shown in FIG. 2 connects two communication ports (e.g., the first system 202 and second system 204). Each port (e.g., the first system 202 and second system 204) includes electrical lanes 212, 228 on a system-side of the link 200 (e.g., a side facing a circuit such as the NIC 216, switch 232, etc.) and optical lanes 214, 230 on the cable 206 side. The example end-to-end link 200 is formed using one or more electrical lanes 212, 228 with optical cable 206 carrying the one or more optical lanes 214, 230 in between the electrical lanes 212, 228. Using the optical transmit and receive sub-lanes 224, 226 and their constituent sub-channels 240, 242, an electrical lane signal is converted to an optical lane signal, and an optical lane signal is converted to an electrical lane signal, for example.

Certain examples provide optical links with elastic bandwidth and resiliency (OLER) for dynamically adaptable end-to-end bandwidth and reliable links between communication ports, etc. Certain examples provide OLER systems and methods to use multiple lower-speed optical sub-lanes as a substitute for a higher-speed electrical lane. In certain examples, OLER allows use of fewer optical sub-lanes when some optical sub-lanes are impaired and/or electrical lanes need less bandwidth. In addition, OLER uses a plurality of optical sub-lanes in a rotation within an optical link associated with an electrical link to provide load balancing or wear-leveling resulting in higher optical link resiliency. In certain examples, optical transceivers 208, 210 on both ends of an optical link 200 (e.g., between NIC and switch ASICs) communicate with each other as well as with their respective near-end ASIC to downgrade and/or upgrade a bandwidth usage of the end-to-end link 200.

Figure 3:
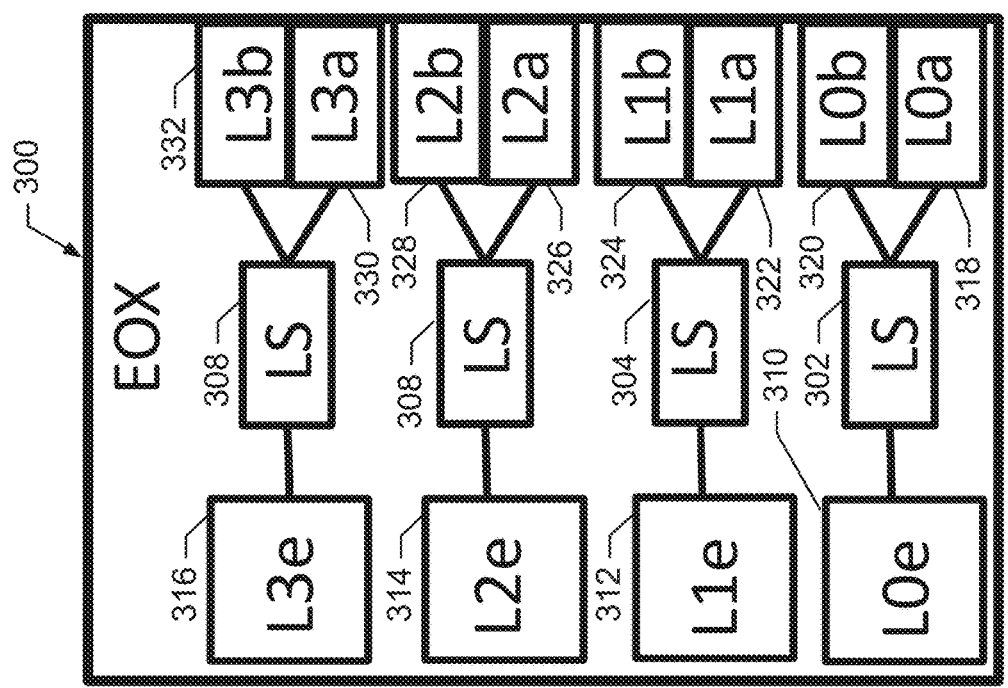
FIG. 3 illustrates an example electrical/optical transceiver circuit to provide optical links with elastic bandwidth and resiliency between two systems.

FIG. 3 illustrates an example electrical/optical transceiver (EOX) 300 to facilitate OLER between two systems. The example EOX 300 includes a plurality of lane switches (LS) 302, 304, 306, 308 to serve as intermediary between electrical transceiver lanes 310, 312, 314, 316 and optical transceiver lanes 318, 320, 322, 324, 326, 328, 330, 332. As shown in the example of FIG. 3, multiple optical transceiver sub-lanes 318-332 are provided for each electrical transceiver lane 310-316.

Optical transmit sub-channels 318-332 can be implemented using vertical-cavity surface-emitting lasers (VCSELs), silicon photonics, etc. Optical receive sub-channels 318-332 can be implemented using a photodiode array, etc. Optical sub-lanes 318-332 are illustrated with individual lines in the examples of FIGS. 2-7. However, optical sub-lanes 318-332 can have different wavelengths, resulting in multiple optical sub-lanes in a physical optical fiber pair.

As described further below in connection with the examples of FIGS. 4-7, each lane switch (LS) 302-308 splits data packets of an electrical lane 310-316 into two optical sub-lanes 318-332 with approximately equal bandwidth when both optical sub-lanes 318-332 are in operation. There are multiple methods to split approximately equal bandwidth from one electrical lane 310-316 to multiple optical sub-lanes 318-332. In one example, (e.g., with respect to a NIC or switch) an ASIC is notified of the presence of optical sub-lanes 318-332 in an end-to-end link (e.g., during a link discovery and configuration phase). For example, one or more ASIC(s) insert one or more optical sub-lane indices in electrical data frames, and the LS 302-308 passively switches an electrical data stream to an available optical sub-lane 318-332 using the sub-lane index/indices. In another example, the presence of optical sub-lanes 318-332 in an end-to-end link is transparent to the ASICs forming the link. In such an example, each LS 302-308 includes sufficient buffers and logic to actively switch data streams of an electrical lane 310-316 to two optical sub-lanes 318-332 to result in approximately equal bandwidth on each optical sub-lane 318-332. Other methods to split bandwidth among multiple sub-lanes 318-332 can also be used. Additionally, while splitting bandwidth equally is used for many practical applications, another bandwidth ratio can determined to divide available bandwidth among multiple sub-lanes 318-332.

In certain examples, as described further below, the LS 302-308 can be controlled by a processor and/or include processing circuitry to identify bandwidth and network conditions to select one or more optical sub-lanes 318-332 to accommodate the relay of data on the electrical lanes 310-316. In certain examples, the LS 302-308 can detect and/or be instructed (e.g., by a NIC, switch, other external processor, etc.) regarding a failure of an optical transceiver lane 318-332 and route communication on remaining optical sub-lanes accordingly. In certain examples, the LS 302-308 can determine and/or be instructed regarding incoming data flow on the electrical lanes via electrical transceiver lanes 310-316. The corresponding LS 302-308 can activate one or more optical transceiver sub-lanes 318-332 to accommodate the incoming electrical lane data flow.

Thus, as described further below, if data is transmitted on an electrical lane at 50 Gbps, the corresponding LS 302-308 activates two optical sub-lanes, each at 25 Gbps, to accommodate the 50 Gbps stream of data. However, if data is transmitted on the electrical lane at 25 Gbps, then the LS 302-308 only activates a single optical sub-lane to accommodate the 25 Gbps of data. The LS 302-308 can also be programmed to cycle through available sub-lanes to avoid undue wear on a single optical transceiver sub-lane 318-332, for example.

FIGS. 4-7 illustrate example circuits depicting a plurality of optical sub-lane configurations using electrical/optical transceivers similar to the example EOX 300 of FIG. 3. These configurations are provided for purposes of illustration only, and a variety of alternative and/or additional configurations are envisioned by the present disclosure. Further, in the examples of FIGS. 4-7, optical connectors, such as connectors 218, 234 of the example of FIG. 2, are not shown for purposes of simplicity to highlight the sub-lanes and other components in these examples. In the examples of FIG. 4-7, while the electrical/optical transceivers are shown separately from their associated link components (e.g., ASICs such as NIC, switch, etc.), the electrical/optical transceivers can be implemented as part of those end components.

While Ethernet end-to-end links are used in the examples of FIGS. 4-7, other network/fabric protocols can be used with optical sub-lanes disclosed herein. In the examples of FIGS. 4-7, the end-to-end links are shown to be between a switch system and one or more NICs (e.g., in server and/or storage systems, etc.), but the end-to-end links can be between other system/circuit types as well (e.g., switch-to-switch, server-to-server, etc.).

Figure 4:
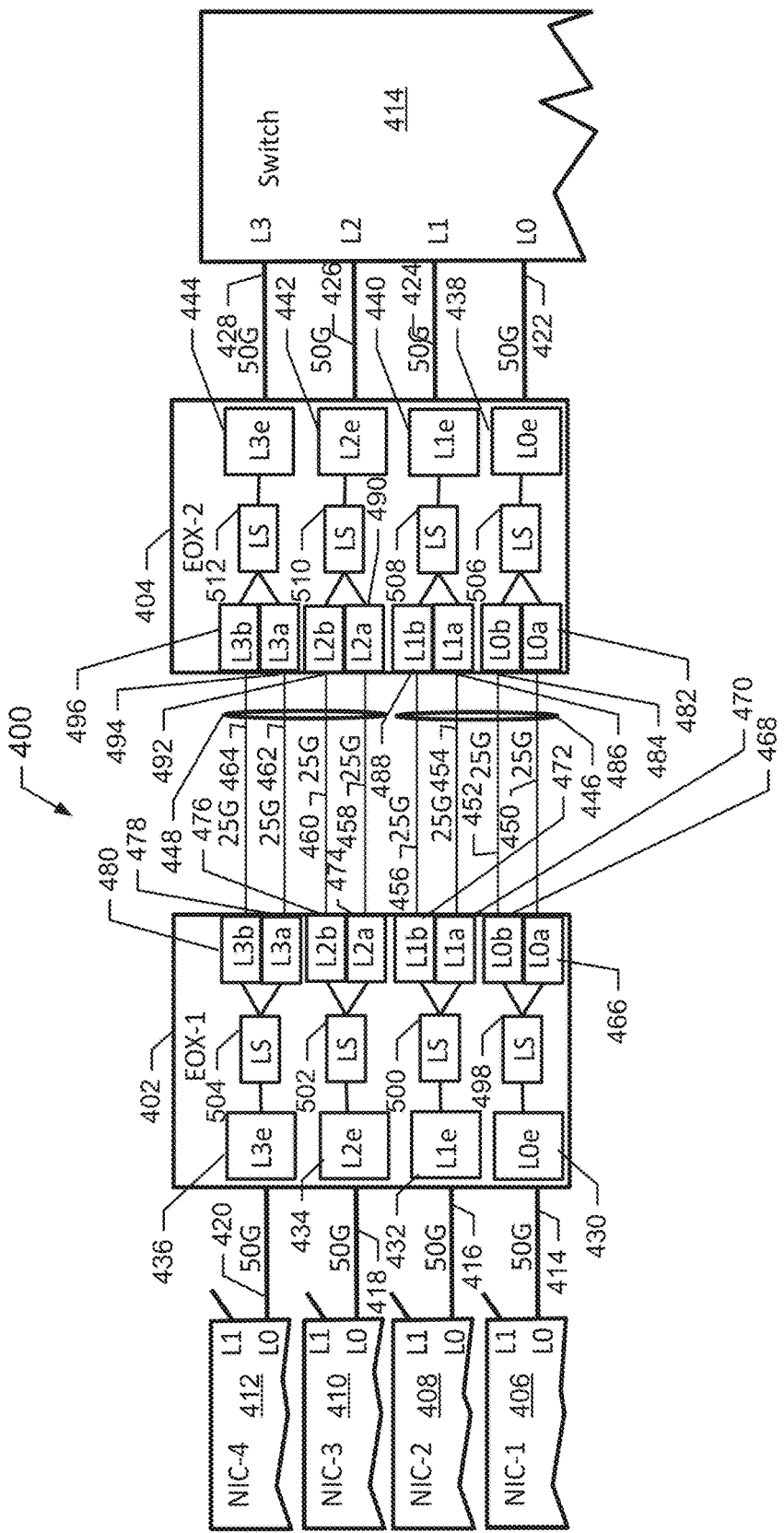
FIG. 4 illustrates an example end-to-end link hardware system including a first plurality of optical sub-lanes connecting electrical lanes to transmit and receive data between components.

FIG. 4 illustrates an example end-to-end link system 400 including a plurality of optical sub-lanes connecting electrical lanes to transmit and receive data between components (e.g., a switch and a plurality of NICs). The example end-to-end link 400 includes a pair of electrical/optical transceivers (EOXs) 402, 404 facilitating data communication between a plurality of NICs 406, 408, 410, 42 and a switch 414.

As shown in the example of FIG. 4, electrical lanes 414, 416, 418, 420 formed between the NIC 406-412 and the EOX 402, as well as the electrical lanes 422, 424, 426, 428 formed between the switch 414 and the EOX 404, are operating at 50 Gbps. For the EOX 402, electrical transceiver lanes L0e-L3e 430, 432, 434, 436 are operating at 50 Gbps. For the EOX 404, electrical transceiver lanes L0e-L3e 438, 440, 442, 444 are operating at 50 Gbps.

In the example of FIG. 4, electrical/optical transceivers 402, 404 provide a plurality of optical sub-lanes formed from optical fibers 446, 448. The optical fiber 446 provides a subset of a plurality of optical sub-lanes 450, 452, 454, 456 between EOXs 402 and 404. Each optical sub-lane 450, 452, 454, 456 may carry an optical signal with a different wavelength. Similarly, the optical fiber 448 provides a subset of a plurality of optical sub-lanes 458, 460, 462, 464 between EOX 402 and EOX 404. Each optical sub-lane 458, 460, 462, 464 may carry an optical signal with a different wavelength. Optical sub-lane 450 and 458 may have the same wavelength. Optical sub-lane 452 and 460 may have the same wavelength. Optical sub-lane 454 and 462 may have the same wavelength. Optical sub-lane 456 and 464 may have the same wavelength. Each sub-lane 450-464 may be allocated to have approximately equal bandwidth usage (e.g., 25 Gbps in the example of FIG. 4). The EOX 402 includes a plurality of optical transceivers 466, 468, 470, 472, 474, 476, 478, 480, one optical transceiver 466-480 associated with each optical sub-lane 450-464. Similarly, the EOX 404 includes a plurality of optical transceivers 482, 484, 486, 488, 490, 492, 494, 496, one optical transceiver 482-496 associated with each optical sub-lane 450-464.

The EOX 402 includes a plurality of lane switches (LS) 498, 500, 502, 504 to route between the electrical transceivers 430-436 and the corresponding optical transceivers 466-480 such that each LS 498-504 splits the 50 Gbps bandwidth of an electrical lane signal from the corresponding electrical transceiver 430-436 and routes the data equally to the 25 Gbps bandwidth of the optical sub-lanes 450-464 via the optical transceivers 466-480. Similarly, the LS 498-504 combines data from pairs of the optical transceivers 466-480 into a single transmission for the electrical transceivers 430-436 in the EOX 402.

The EOX 404 also includes a plurality of LS 506, 508, 510, 512 to route between the electrical transceivers 438-444 and the optical transceivers 482-496 such that each LS 506-512 splits the 50 Gbps bandwidth of an electrical lane signal from the corresponding electrical transceiver 438-444 and routes the data equally to the 25 Gbps bandwidth of the optical sub-lanes 450-464 via the optical transceivers 482-496. Similarly, the LS 506-512 combines data from pairs of the optical transceivers 482-496 into a single transmission for the electrical transceivers 438-444 in the EOX 404.

Thus, the example of FIG. 4 demonstrates how electrical systems 406, 408, 410, 412, 414 can communicate with each other via a first number of electrical lanes 414-428 at 50 Gbps while utilizing multiple optical sub-lanes 450-464 operating at 25 Gbps. As discussed above, lane switches 498-512 within the EOXs 402, 404 split and combine data packets between a single electrical lane 414-428 and multiple optical sub-lanes 450-464 (e.g., two optical sub-lanes per electrical lane in the example of FIG. 4) according to approximately equal bandwidth in the example of FIG. 4, when all optical sub-lanes 450-464 are in operation. Each LS 498-512 can split and combine data packets transparently to the NIC 406-412 and switch 414 systems and/or upon notifying the connected ASICs 406-414 of the presence of optical sub-lanes 450-464, for example.

Figure 5:
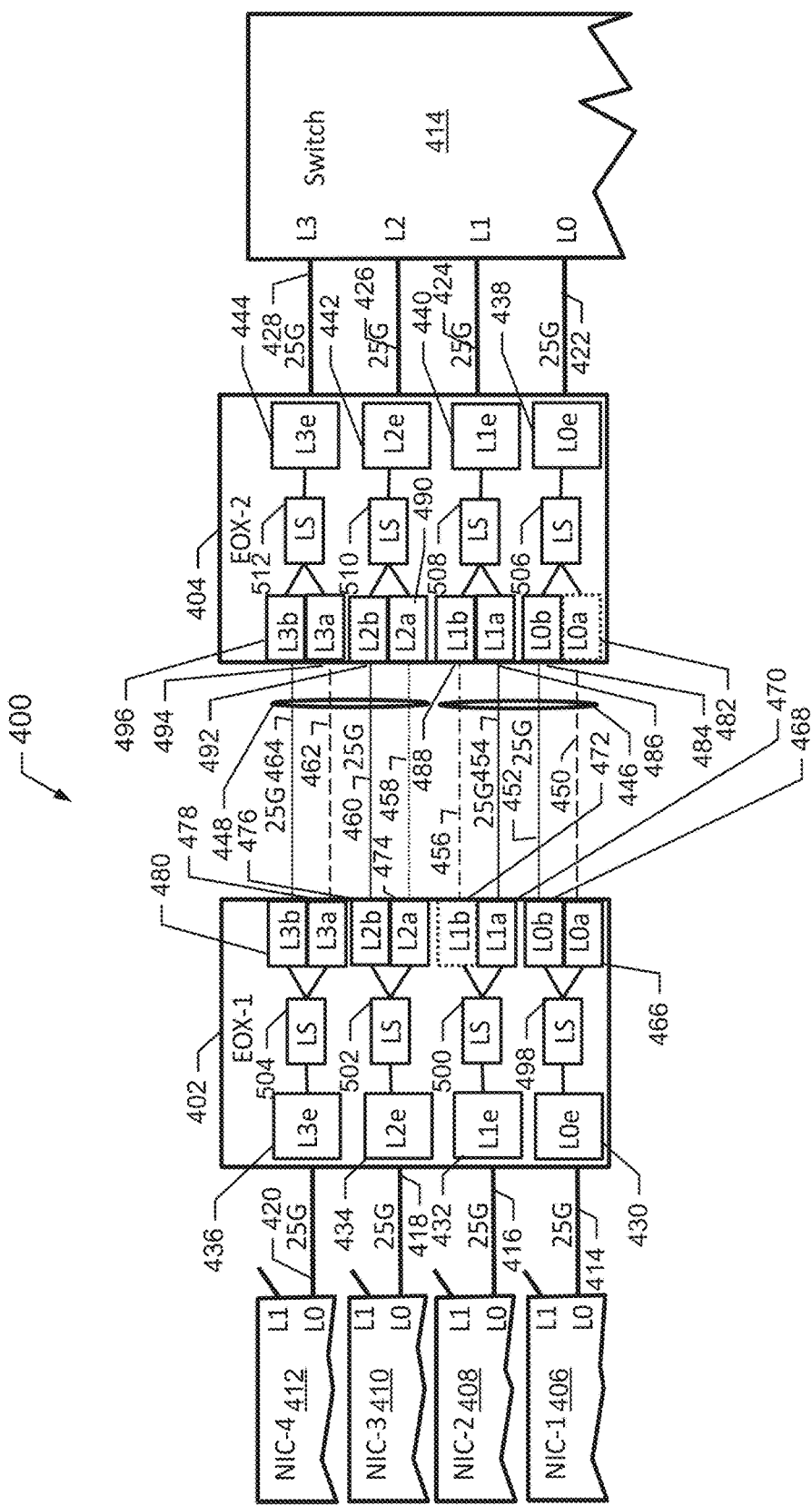
FIG. 5 illustrates the example end-to-end link hardware system of FIG. 4 with a down-shift in data rate.

In the example of FIG. 5, the example end-to-end link system 400 is down-shifted from 50 Gbps to 25 Gbps. Additionally, as depicted in the example of FIG. 5, optical transceiver L0a 482 of EOX 404 has failed, which renders unusable the optical sub-lane 450 and leaves the L0b optical sub-lane 452 between EOX 402 and EOX 404 to transmit data between NIC-1 406 and the switch 414 at 25 Gbps. Additionally, in the example of FIG. 5, optical transceiver L1b 472 of the EOX 402 has failed, which renders unusable the optical sub-lane 458 and leaves the L1a sub-lane 470 between the EOX 402 and EOX 404 to transmit data between NIC-2 408 and the switch 414. As illustrated in the example of FIG. 5, the optical sub-lane 458 between EOX 402 and EOX 404 has failed, leaving the L2b optical sub-lane 460 to transmit data between the NIC-3 410 and the switch 414. The L2b optical sub-lane 460 operates at 25 Gbps, for example.

Additionally, aside from the failed transceivers 472, 482 in the example of FIG. 5, the NIC-4 412 has less than 25 Gbps of data to be communicated to the switch 414, The LS 504 selects the L3b optical sub-lane 464 to transmit data between the NIC-4 412 and the switch 414 at 25 Gbps. The L3a optical sub-lane 462 is deactivated by the LS 504 since the added bandwidth is not to be used. In the example of FIG. 5, when all electrical lanes 414-420 and 422-428 use less than 25 Gbps, the EOX transceivers 402, 404 can consume half their normal power load (e.g., their normal power load at 50 Gbps, etc.).

As discussed above, if an optical sub-lane is damaged or unneeded, the respective LS 498-504, 506-512 of the EOX 402, 404 controlling that sub-lane disables the non-operating sub-lane after negotiating with the other EOX 402, 404. Each optical transceiver 402, 404 also communicates with its connected NIC 406-412 and/or switch 414 to down-shift bandwidth over an optical link when the "normal" bandwidth appears to be more than appropriate for the current data load.

Figure 6:
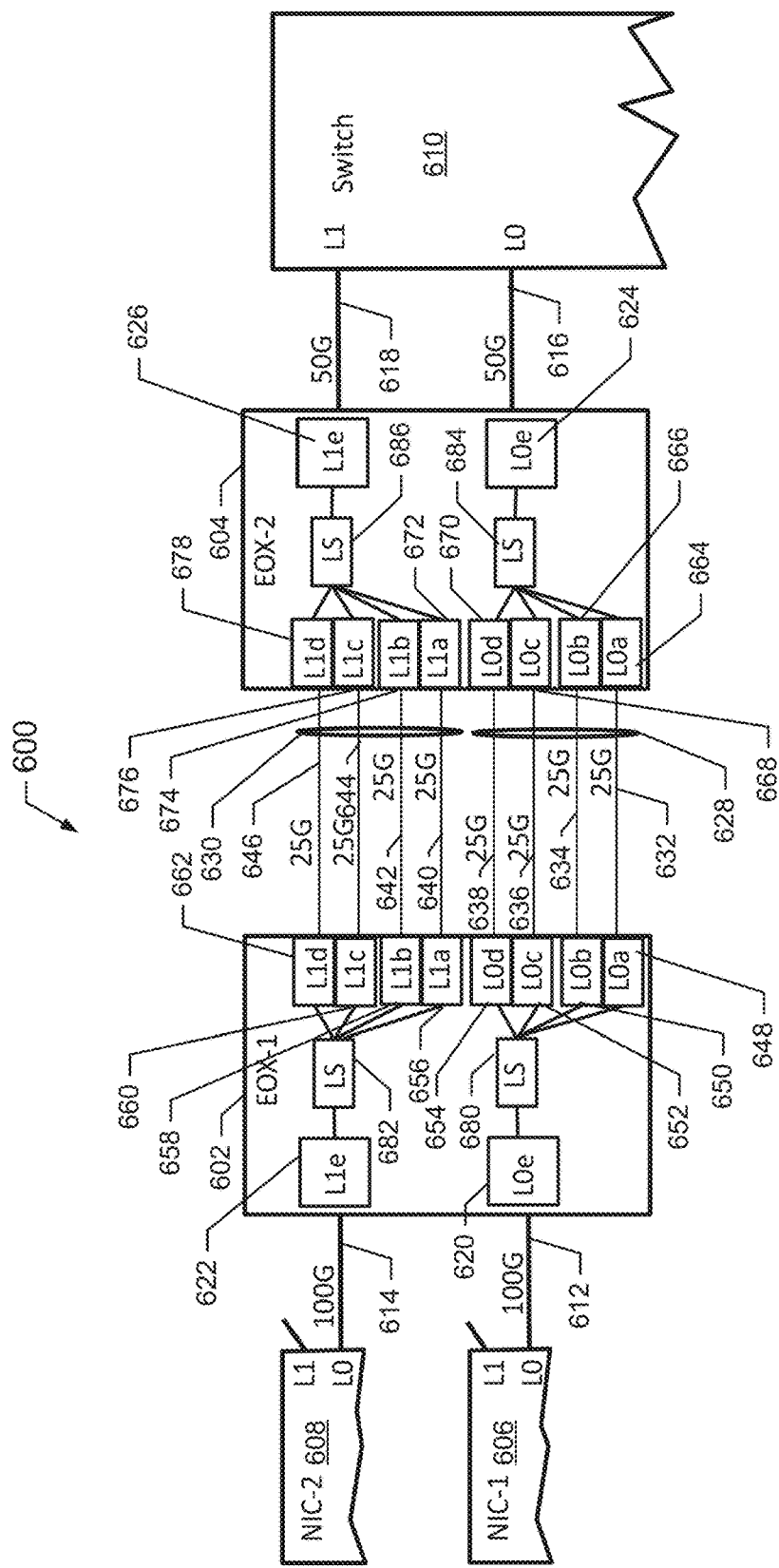
FIG. 6 illustrates an example end-to-end link hardware system including a second plurality of optical sub-lanes connecting electrical lanes to transmit and receive data between components.

FIG. 6 illustrates an example end-to-end link system 600 including a plurality of optical sub-lanes connecting electrical lanes to transmit and receive data between components. The example end-to-end link 600 is similar to the example end-to-end link 400, except the example system 600 includes fewer lane switches (LS) controlling more optical transceiver lanes to enable more flexible load balancing of a signal bandwidth of an electrical lane among lesser signal bandwidths of the optical sub-lanes.

The example end-to-end-link system 600 includes a pair of electrical/optical transceivers (EOXs) 602, 604 facilitating data communication between a plurality of NICs 606, 608 and a switch 610. As shown in the example of FIG. 6, electrical lanes 612, 614 formed between the NIC 606, 608 and the EOX 602, as well as the electrical lanes 616, 618 formed between the switch 610 and the EOX 604, are operating at a data rate of 100 Gbps. For the EOX 602, electrical transceivers L0e-L1e 620, 622 are operating at 100 Gbps. For the EOX 604, electrical transceivers L0e-L1e 624, 626 are operating at 100 Gbps.

In the example of FIG. 6, electrical/optical transceivers 602, 604 provide a plurality of optical sub-lanes formed from optical fibers 628, 630. The optical fiber 628 provides a subset of a plurality of optical sub-lanes 632, 634, 636, 638 between EOX 602 and 604. The optical fiber 630 provides a subset of a plurality of optical sub-lanes 640, 642, 644, 646 between EOX 602 and 604. Each sub-lane 632-646 is allocated to have approximately equal bandwidth usage (e.g., 25 Gbps in the example of FIG. 6). The EOX 602 includes a plurality of optical transceivers 648, 650, 652, 654, 656, 658, 660, 662, one optical transceiver 648-662 associated with each optical sub-lane 632-646. Similarly, the EOX 604 includes a plurality of optical transceivers 664, 666, 668, 670, 672, 674, 676, 678, one optical transceiver 664-678 associated with each optical sub-lane 632-646.

The EOX 602 includes a plurality of lane switches (LS) 680, 682 to route between the electrical transceivers 620, 622 and the optical transceivers 648-662. For example, the LS 680 splits an electrical lane signal from the corresponding electrical transceiver 620 and routes the data equally to the 25 Gbps bandwidth of the optical sub-lanes 632-638 via the optical transceivers 648-654. Similarly, the LS 680 combines data from pairs of the optical transceivers 648-654 into a single transmission for the electrical transceiver 620 in the EOX 602.

Additionally, the LS 682 included in the EOX 602 routes data between the electrical transceiver 622 and the optical transceivers 656-662 such that the LS 682 splits an electrical lane signal from the corresponding electrical transceiver 622 and routes the data equally to the 25 Gbps bandwidth of the optical sub-lanes 640-646 via the optical transceivers 656-662. Similarly, the LS 682 combines data from pairs of the optical transceivers 656-662 into a single transmission for the electrical transceiver 622 in the EOX 602.

Similar to the EOX 602, the EOX 604 also includes a plurality of LS 684, 686 to route data between the electrical transceivers 624, 626 and the optical transceivers 664-678 such that each LS 684, 686 splits an electrical lane signal from the corresponding electrical transceiver 624, 626 and routes the data equally to the 25 Gbps bandwidth of the optical sub-lanes 632-646 via the optical transceivers 664-678. Similarly, the LS 684, 686 combines data from pairs of the optical transceivers 664-678 into a single transmission for the electrical transceivers 624, 626 in the EOX 604.

Thus, the example of FIG. 6 demonstrates how electrical systems 606, 608, 610 can communicate with each other via a first number of electrical lanes 612-618 at 100 Gbps while utilizing multiple optical sub-lanes 632-646 at 25 Gbps. As discussed above, lane switches 680-686 within the EOXs 602, 604 split and combine data packets between a single electrical lane 612-618 and multiple optical sub-lanes 632-646 (e.g., four optical sub-lanes per electrical lane in the example of FIG. 6) according to approximately equal bandwidth in the example of FIG. 6, when all optical sub-lanes 632-646 are in operation. Each LS 680-686 can split and combine data packets transparently to the NIC 606, 608 and switch 610 systems and/or upon notifying the connected ASICs 606-610 of the presence of optical sub-lanes 632-646, for example.

Figure 7:
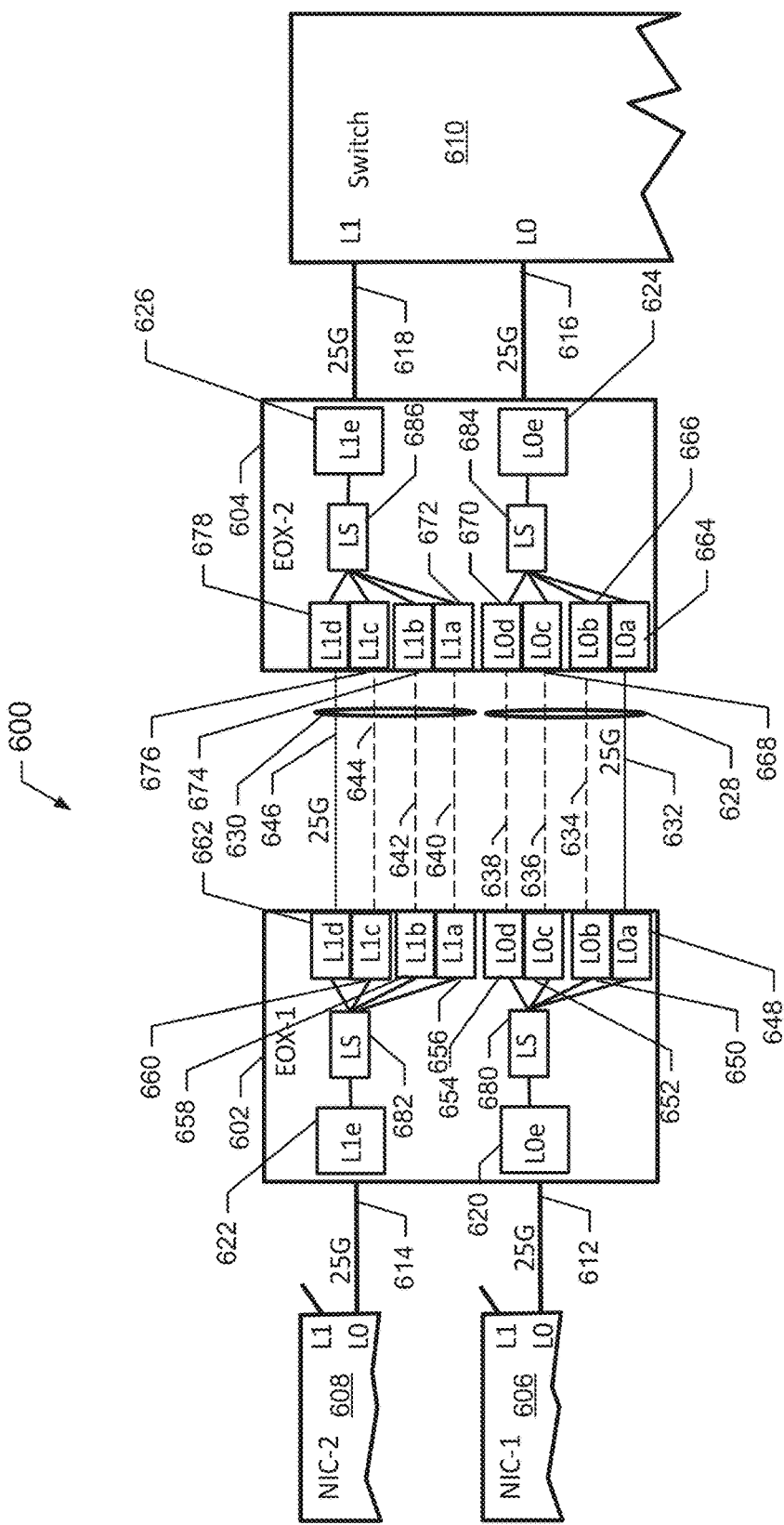
FIG. 7 illustrates the example end-to-end link hardware system of FIG. 6 with a down-shift in data rate.

In the example of FIG. 7, the example end-to-end link system 600 is down-shifted from 100 Gbps to 25 Gbps. Each electrical lane 612-618 has data at 25 Gbps, rather than 100 Gbps as in the example of FIG. 6. Since the data rate on the electrical lanes 612-618 has decreased to a data rate that the optical sub-lanes 632-646 can individually accommodate, lane splitting no longer occurs. The LS 680-686, however, can rotated among the available optical sub-lanes 632-646 to avoid unnecessary wear on the optical sub-lanes 632-646 and their associated optical transceivers 648-678. If an error, damage, and/or other disability is detected with respect to the optical sub-lanes 632-646 and/or their associated optical transceivers 648-678, the LS 680-686 can shift data transfer to another available optical sub-lane 632-646 at 25 Gbps. Unused optical sub-lanes 632-646 and associated transceivers 648-678 can be deactivated until ready to be used.

In the example of FIG. 7, the LS 680 of EOX 602 selects optical sub-lane 632 to transmit data from the electrical lane 612 at 25 Gbps. The LS 680 activates optical transceiver lane 648 and notifies the LS 684 of the EOX 604, which activates optical transceiver lane 664 to establish the optical sub-lane 632 with the transceiver 648. Note that this communication can be in reverse if data is coming from the switch 610 via the electrical lane 616, for example. Also note that the communication between LS 680 of EOX 602 and LS 684 of EOX 604 may be in-band initially started and remained unchanged via the default optical sub-lane 632, for example. Similarly, the LS 682 of EOX 602 selects optical sub-lane 646 to transmit data from the electrical lane 614 at 25 Gbps. The LS 682 activates optical transceiver lane 662 and notifies the LS 686 of the EOX 604, which activates optical transceiver lane 678 to establish the optical sub-lane 646 with the transceiver 662. Note that this communication can be in reverse if data is coming from the switch 610 via the electrical lane 618, for example. Also note that the communication between LS 682 of EOX 602 and LS 686 of EOX 604 may be in-band initially started via the default optical sub-lane 640, for example, but moved over to optical sub-lane 646 after LS 682 of EOX 602 and LS 686 of EOX 604 mutually agreed before moving over from optical sub-lane 640.

Thus, as illustrated in the example of FIG. 7, each respective lane switch (LS) 680-686 of the EOX 602, 604 disables a non-operating optical sub-lane 634-644 after negotiating with the corresponding EOX 602, 604. Additionally, the EOX 602 and/or 604 can communicate with its connected components 606-610 regarding down-shifted bandwidth over the link 600. Such downshifting can save power as well as wear on the optical components of the link 600, for example.

While example implementations of the example electrical/optical transceivers 208, 210, 300, 402, 404, 602, 604 and surrounding end-to-end link systems 200, 400, 600 are illustrated in FIGS. 2-7, elements, processes and/or devices illustrated in FIGS. 2-7 may be combined, divided, re-arranged, omitted, eliminated and/or implemented in any other way. Further, the example NIC 216, 406-412, 606, 608; the example switch 232, 414, 610; the example EOX 208, 210, 300. 402. 404, 602, 604; and/or, more generally, the example end-to-end link systems 200, 400, 600, may be implemented by hardware, machine readable instructions, software, firmware and/or any combination of hardware, machine readable instructions, software and/or firmware. Thus, for example, any of the example NIC 216, 406-412, 606, 608; the example switch 232, 414, 610; the example EOX 208, 210, 300, 402, 404, 602, 604; and/or, more generally, the example end-to-end link systems 200, 400, 600 can be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)), When reading any of the apparatus or system claims of this patent to cover a purely software and/or firmware implementation, at least one of the example NIC 216, 406-412, 606, 608; the example switch 232, 414, 610; the example EOX 208. 210, 300, 402, 404, 602, 604; and/or, more generally, the example end-to-end link systems 200, 400, 600 is/are hereby expressly defined to include a tangible computer readable (or other machine readable) storage device such as DRAM, SRAM, non-volatile RAM, etc. or storage disk such as a memory, a digital versatile disk (DVD), a Blu-ray disk, etc. storing the software and/or firmware. Further still, the examples of FIGS. 2-7 can include elements, processes and/or devices in addition to, or instead of, those illustrated in FIGS. 2-7, and/or may include more than one of any or all of the illustrated elements, processes and devices.

Figure 8:
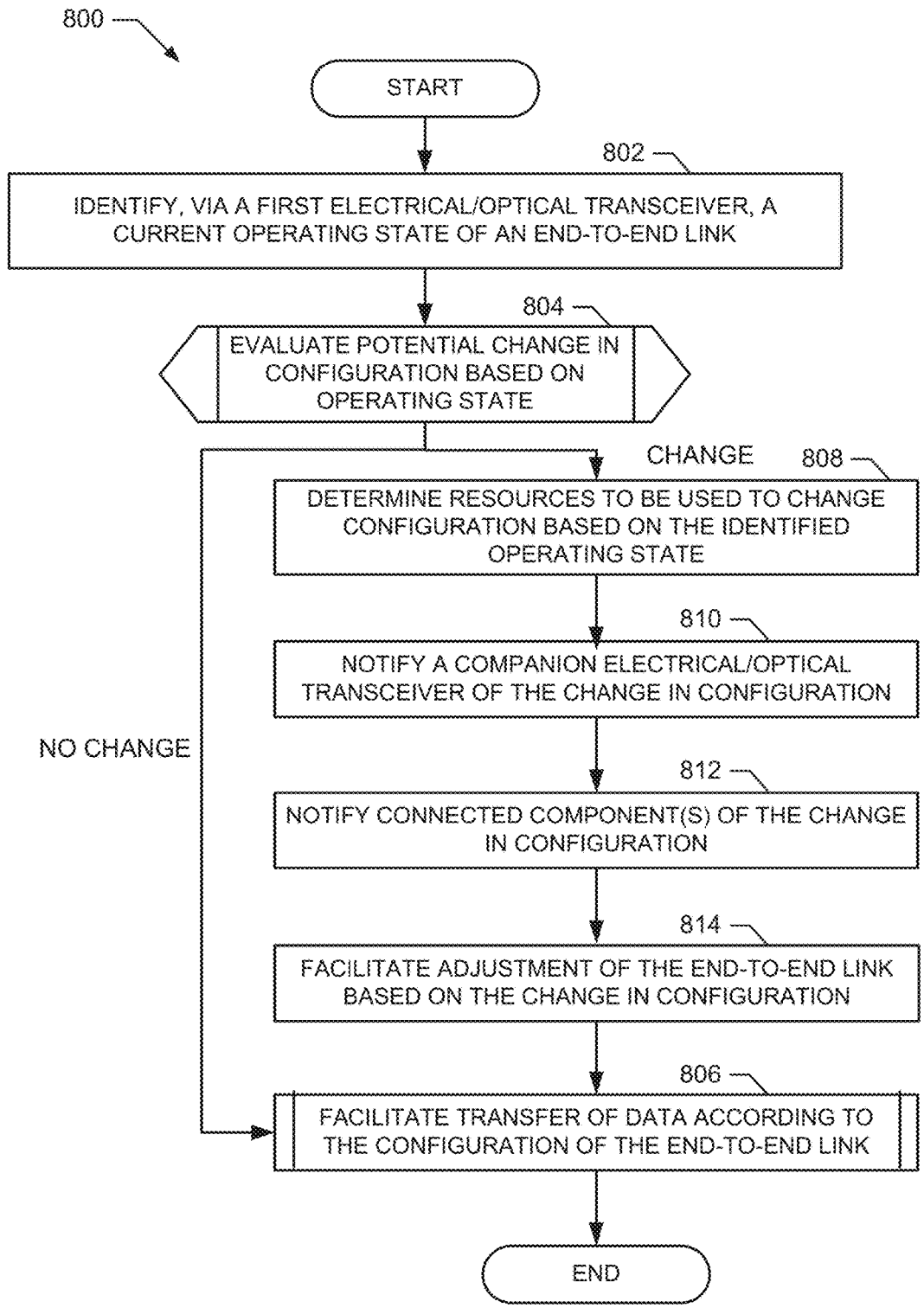
FIG. 8 is an example flowchart representative of example machine readable instructions that may be executed by an example electrical/optical transceiver to control the example electrical/optical transceiver and its surrounding end-to-end link system.

A flowchart representative of example machine readable instructions for controlling and/or operating the example electrical/optical transceiver 208, 210, 300, 402, 404, 602, 604 of FIGS. 2-7 is shown in FIG. 8. In the example, the machine readable instructions form a program for execution by a processor such as the processor 1612 shown in the example processor platform 16500 discussed below in connection with FIG. 16. The program may be embodied in machine readable instructions stored on a tangible computer readable (and/or machine readable) storage medium such as a hard drive, a digital versatile disk (DVD), a Blu-ray disk, firmware, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 8, many other methods of controlling and/or operating the example EOX 208, 210, 300, 402, 404, 602, 604 of FIGS. 2-7 may alternatively be used. For example, the order of execution of the blocks may be changed, and/or some of the blocks described may be changed, eliminated, or combined.

As mentioned above, the example process of FIG. 8 may be implemented using coded instructions (e.g., computer and/or machine readable instructions) stored on a tangible computer readable (and/or machine readable) storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, firmware, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim it is open-ended in the same manner as the term "comprising" is open ended.

FIG. 8 is an example flowchart 800 representative of example machine readable instructions that may be executed by the example EOX 208, 210, 300, 402, 404, 602, 604 of FIGS. 2-7 to control the example EOX 208, 210, 300, 402, 404, 602, 604 of FIGS. 2-7 and its surrounding end-to-end link system 200, 400, 600.

At block 802, the example EOX 208, 210, 300, 402, 404, 602, 604 identifies a current operational state of the example end-to-end link system 200, 400, 600 in which the EOX 208, 210, 300, 402, 404, 602, 604 is operating to communicate data between components. For example, the EOX 208, 210, 300, 402, 404, 602, 604 determines how data transferred to and from electrical lanes are to be split among multiple optical sub-lanes in the end-to-end link 200, 400, 600 according to a system configuration.

At block 804, the example EOX 208, 210, 300, 402, 404, 602, 604 evaluates a potential change in the system's configuration based on one or more factors. For example, the EOX 208, 210, 300, 402, 404, 602, 604 automatically identifies reduced electrical lane bandwidth utilizations, failures or errors in connected hardware such as its optical transceivers and associated sub-lanes, instructions from associated components regarding link configuration, etc.

At block 806, if no change in configuration is indicated, then data transfer continues via the end-to-end link 200, 400, 600. For example, data transferred to/from a single electrical lane is routed to one or more optical sub-lanes in the end-to-end-link 200, 400, 600 to transfer data between connected components, such as the NIC 216, 406-412, 606, 608; switch 232, 414, 610; etc.

However, if a change in configuration is indicated (e.g., by an instruction, reduced electrical lane bandwidth usage, component fault, etc.), then at block 808, the EOX 208, 210, 300, 402, 404, 602, 604 determines resources to be used in a change in configuration. For example, if the electrical lane usage is less than fifty percent over a given time period, the EOX 208, 210, 300, 402, 404, 602, 604 can trigger an electrical link bandwidth under-utilization condition, which in turn triggers a bandwidth downshift condition among the optical sub-lanes. Alternatively or in addition, the EOX 208, 210, 300, 402, 404, 602, 604 can identify a fault or error in a component and identify an alternate or replacement for that component to continue data transmission. Thus, the EOX 208, 210, 300, 402, 404, 602, 604 can determine that a trigger exists to change configuration in response to its current operating state and can determine what that change in configuration should be.

At block 810, the EOX 208, 210, 300, 402, 404, 602, 604 notifies its companion EOX 208, 210, 300, 402, 404, 602, 604 in the end-to-end link 200, 400, 600 of the change in configuration. The companion EOX 208, 210, 300, 402, 404, 602, 604 must mirror the change proposed by the first EOX 208, 210, 300, 402, 404, 602, 604 for the change in configuration to function properly in the end-to-end link system 200, 400, 600. Thus, as in the example of FIG. 7, if the EOX 602 determines that only 25 Gbps are needed to transmit data with respect to the electrical lanes 612, 614, and selects optical transceiver 662 to activate optical sub-lane 646 through the LS 682, the EOX 602 also notifies the EOX 604 to correspondingly activate optical transceiver 678 such that the optical sub-lane 646 is activated between the two transceivers 602, 604.

At block 812, the EOX 208, 210, 300, 402, 404, 602, 604 notifies the one more circuits and/or other components (e.g., NIC, switch, other ASIC, etc.) of the change in configuration. For example, the example EOX 402 of the example of FIG. 5 notifies the NIC 412 that the optical sub-lane bandwidth will be downshifted to 25 Gbps, utilizing only a single sub-lane 464 instead of both optical sub-lanes 462, 464. In some examples, the ASIC (e.g., NIC, switch, etc.) determines that downshifting of bandwidth should occur on the electrical lanes and notifies the EOX 208, 210, 300, 402, 404, 602, 604 of that change in configuration so that the EOX 208, 210, 300, 402, 404, 602, 604 can react and reconfigure accordingly.

At block 814, the example EOX 208, 210, 300, 402, 404, 602, 604 facilitates adjustment of the configuration of the end-to-end link 200, 400, 600 based on the change in configuration. For example, the EOX 208, 210, 300, 402, 404, 602, 604 facilitates downshifting through selection of a sub-set of available optical sub-lanes, facilitates error recovery through selection of an alternate optical sub-lane, and facilitates load balancing through a rotation among optical sub-lanes to avoid undue wear on any given sub-lane, etc. The EOX 208, 210, 300, 402, 404, 602, 604 does so in communication with its companion EOX 208, 210, 300, 402, 404, 602, 604 forming the end-to-end-link between components. In some examples, data transfer is paused (e.g., by the EOX 208, 210, 300, 402, 404, 602, 604 and/or by connected components (e.g., ASICs such as NIC, switch, etc.) while reconfiguration is facilitated, and data transfer resumes via re-stablished links once the reconfiguration is complete.

At block 816, the example EOX 208, 210, 300, 402, 404, 602, 604 facilitates data transfer according to the updated configuration. For example, as in the example of FIG. 5, the EOX 404 instructs the LS 498 to route data over the optical sub-lane 452 between transceivers 468 and 484, not over the optical sub-lane 450, based on a change in configuration due to an identified fault in transceiver 482.

Figure 9:
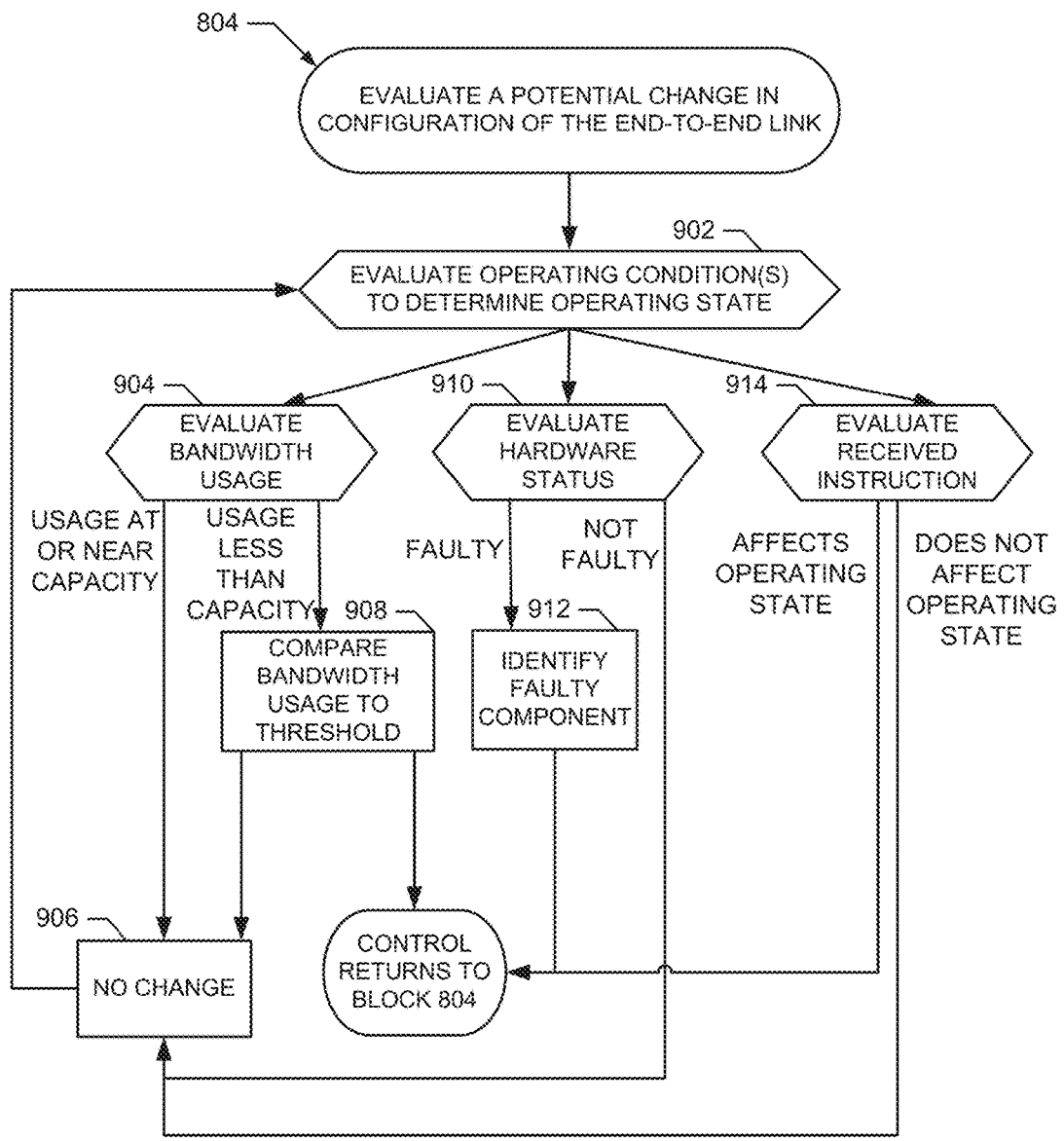
FIG. 9 is an example flowchart representative of example machine readable instructions that may be executed by an example electrical/optical transceiver to control the example electrical/optical transceiver and its surrounding end-to-end link system and provides additional detail regarding an example implementation of the flowchart of FIG. 8.

FIG. 9 is an example flowchart representative of example machine readable instructions that may be executed by the example EOX 208, 210, 300, 402, 404, 602, 604 of FIGS. 2-7 to control the example EOX 208, 210, 300, 402, 404, 602, 604 of FIGS. 2-7 and its surrounding end-to-end link system 200, 400, 600. The example flowchart of FIG. 9 provides additional detail regarding an example implementation of block 804 of the flowchart of FIG. 8 to evaluate, via the example EOX 208, 210, 300, 402, 404, 602, 604, a potential change in configuration for the end-to-end link 200, 400, 600.

At block 902, one or more operating conditions are evaluated to determine the operating state. For example, the EOX 208, 210, 300, 402, 404, 602, 604 evaluates data transfer bandwidth (e.g., available bandwidth versus actual usage, etc.), an operating state of components (e.g., responsiveness or fault in transceivers, lane switches, sub-lanes, etc.), and/or external instruction (e.g., from a connected circuit, etc.).

At block 904, a first operating condition, bandwidth usage, is evaluated. For example, the EOX 208, 210, 300, 402, 404, 602, 604 evaluates data traffic on one or more electric lane to determine how much of the available bandwidth is being used.

If bandwidth usage is at capacity (e.g., at 50 Gbps, 100 Gbps, etc.) and/or near capacity within a tolerance of capacity (e.g., using 45 Gbs of a 50 Gbps lane, using 75 Gbps of a 100 Gbps lane, etc.), then, at block 906, no change is warranted based on the operating state of bandwidth usage. In some examples, control returns to block 902 to evaluate, if one is available, another operating condition.

At block 908, if bandwidth usage is less than capacity (e.g., a certain percentage, such as 50%, less than full capacity), then the bandwidth usage is further evaluated to determine whether bandwidth usage on the electrical lanes is less than a threshold of the maximum available bandwidth. If no change is determined to be warranted based on a comparison of measured bandwidth usage to the threshold, then, at block 906, no change is warranted based on the operating state of bandwidth usage. If, however, a change in configuration is determined to be warranted based on a comparison of current operating state of the bandwidth usage to the threshold, then control proceeds to block 804 in the example flow of FIG. 8 to determine resources to be used to change configuration based on the identified operating state.

For example, if less than fifty percent of available electrical lane bandwidth is being used (e.g., as measured over a period of time), then a downshifting of bandwidth may be warranted. If, however, more than 50% (e.g., seventy-five percent) of available bandwidth is being used, then no change in configuration may be warranted.

At block 910, a second operating condition, hardware status, is evaluated, For example, hardware forming part of the example EOX 208, 210, 300, 402, 404, 602, 604 is evaluated to determine whether it is functioning properly. If a component, such as a lane shifter, electrical lane transceiver, optical lane transceiver, etc., is determined to be unresponsive, malfunctioning, etc., then, at block 912, an identification of the faulty component is provided to block 804 to facilitate a determination of resources for reconfiguration. For example, if an optical transceiver and/or its associated optical sub-lane is determined to be faulty, then an identification of the fault is provided to block 804 so that an alternative optical transceiver and associated optical sub-lane can be used for data transfer instead (and/or an amount of data transferred can be adjusted, etc.).

In some examples, an identification of a faulty component can be provided by one EOX 208, 210, 300, 402, 404, 602, 604 to another EOX 208, 210, 300, 402, 404, 602, 604. For example, if an optical transceiver at a second EOX 208, 210, 300, 402, 404, 602, 604 is faulty, but a first EOX 208, 210, 300, 402, 404, 602, 604 is conducting the fault analysis, the second EOX 208, 210, 300, 402, 404, 602, 604 can alert the first EOX 208, 210, 300, 402, 404, 602, 604 to the fault. If no component is identified as faulty or otherwise unresponsive, then, at block 906, no change need be made based on hardware status.

At block 914, a third operating condition, received instruction, is evaluated to identify an instruction to adjust configuration. For example, a connected ASIC 216, 232, 406-414, 606-610 may alert the EOX 208, 210, 300, 402, 404, 602, 604 through an instruction or command that a downshift in bandwidth usage should be configured. In other examples, a connected ASIC may send an instruction to the EOX 208, 210, 300, 402, 404, 602, 604 indicating a fault component, instructing a load distribution or rotation among optical sub-links, etc. If a received instruction affects the operating state to warrant a change in configuration, then control is passed to block 804 with an indication of the change (e.g., bandwidth downshift, faulty component, load balancing, etc.). In certain examples, if the received instruction does not affect the operating state to warrant a change in configuration, then control returns to block 906 to indicate no change and then to block 902 to evaluate, if one is available, another operating condition. If all available operating conditions have been evaluated, then the EOX 208, 210, 300, 402, 404, 602, 604 and/or other process or processor can monitor for a change in operation condition to trigger further review. In some examples, rather than continue to monitor for an updated or new operating condition, the example process returns until triggered again for analysis.

Figure 10:
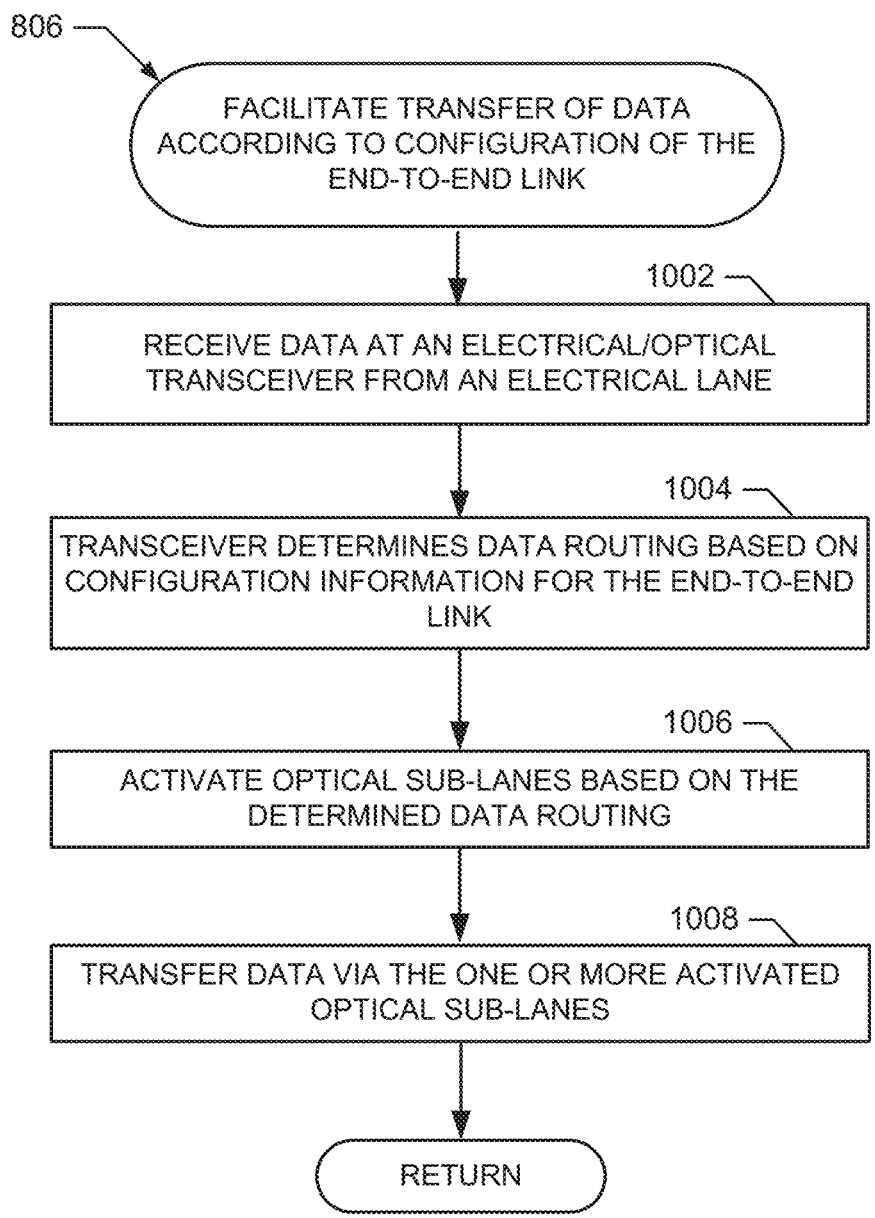
FIG. 10 is an example flowchart representative of example machine readable instructions that may be executed by an example electrical/optical transceiver to control the example electrical/optical transceiver and its surrounding end-to-end link system and provides additional detail regarding an example implementation of the flowchart of FIG. 8.

FIG. 10 is an example flowchart representative of example machine readable instructions that may be executed by the example EOX 208, 210, 300, 402, 404, 602, 604 of FIGS. 2-7 to control the example EOX 208, 210, 300, 402, 404, 602, 604 of FIGS. 2-7 and its surrounding end-to-end link system 200, 400, 600. The example flowchart of FIG. 10 provides additional detail regarding an example implementation of block 806 of the flowchart of FIG. 8 to facilitate transfer of data according to the configuration of the end-to-end link 200, 400, 600. For example, the EOX 208, 210, 300, 402, 404, 602, 604 can shift, via LS 302-308, 498-512, 680-686 data from an electrical lane 414-428, 612-618 to one or more optical sub-lanes 450-464, 632-646. Note that, while the following example process is described, for purposes of illustration only, with respect to receiving data via electrical lanes 414-428, 612-628, the example process can be reversed to send data to the electrical lanes 414-428, 612-618.

At block 1002, the EOX 208, 210, 300, 402, 404, 602, 604 receives data (e.g., data frames, bytes, etc.) from an electrical lane 414-428, 612-628. For example, data can be received by the EOX 208, 210, 300, 402, 404, 602, 604 from the NIC 216, 406-412, 612-614; the switch 232, 414, 610; etc., via electrical lanes 414-428, 612-628.

At block 1004, the EOX 208, 210, 300, 402, 404, 602, 604 determines data routing based on the configuration information for the end-to-end-link and its EOX 208, 210, 300, 402, 404, 602, 604. For example, the configuration can specify where and how the data is to be routed by the LS 302-308, 498-512, 680-686 of the EOX 208, 210, 300, 402, 404, 602, 604 among available optical transceivers 318-332, 466-496, 648-678.

For example, data striping can be used to split bandwidth across multiple lanes. Using data striping, information can be segmented to separate chunks or frames of data across multiple lanes or sub-lanes. Data striping can be used to drive the LS 302-308, 498-512, 680-686 to divert or stripe data from an electrical lane 414-428, 612-618 to one or more optical sub-lanes 450-464, 632-646 to split bandwidth across multiple lanes. Data striping methods include frame striping, byte striping across two lanes, byte striping across more than two lanes, frame encapsulation, etc.

Figure 11:
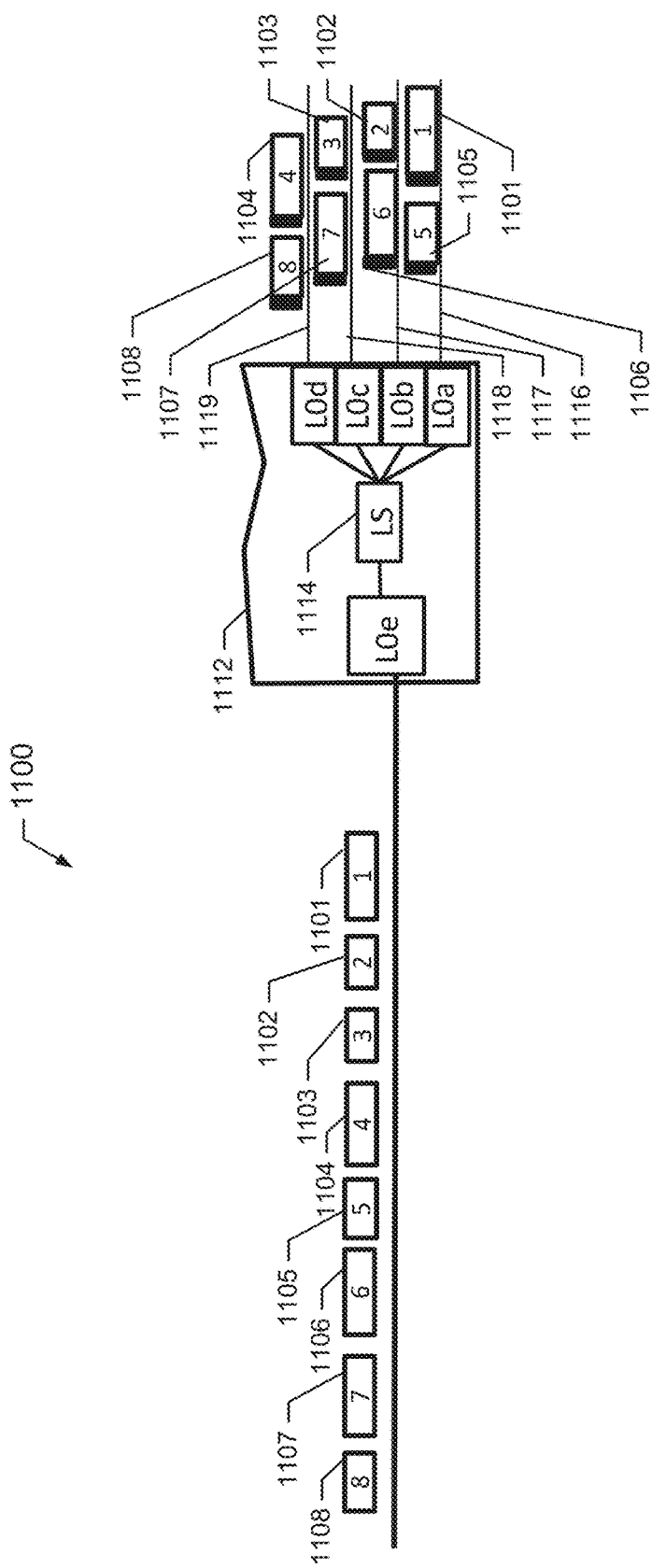
FIG. 11 depicts an example frame striping configuration in which data frames on an electrical lane are distributed among a plurality of optical sub-lanes.

As shown in the example of FIG. 11, with frame striping, a transmitter (e.g., a first EOX 208, 210, 300, 402, 404, 602, 604) of the data adds header information to each frame of the data including identifying information (e.g., port number, sequence number, etc.), and a receiver (e.g., a second EOX 208, 210, 300, 402, 404, 602, 604) of the data re-constructs the original stream of data frames. The transmitter includes arbitration logic in its LS 302-308, 498-512, 680-686 to decide which optical sub-lane 450-464, 632-646 to use for each electrical data frame. For example, the arbitration logic ("the arbiter") may load balance across all available optical sub-lanes, such as by keeping track of a byte count of each frame, and approximately routing data across the available optical sub-lanes based on frame boundaries to allocate data approximately equally across all available optical sub-lanes. In some examples, the arbitration logic may examine frame headers and route frames according to a priority level specified in the header (e.g., for quality of service (QoS) requirements, etc.). Thus, according to priority (e.g., a priority list, a round robin scheme, etc.), higher priority electrical lane ports are allocated ahead of other lower priority electrical lane ports if a higher priority lane has a data frame ready for transmission.

There may be two or more optical sub-lanes 450-464, 632-646 associated with each electrical lane 414-428, 612-628, for example. In some examples, one or more optical sub-lanes 450-464, 632-646 may not be used due to fault, power conservation, load balancing, and/or other consideration or constraint.

In some examples, a subset of optical sub-lanes 450-464, 632-646 may be operational at an aggregate bandwidth lower than the electrical lanes 414-428, 632-646. For example, one or more optical sub-lanes may not be functional, and the remaining optical sub-lanes operate at full speed (e.g., 25 Gbps, etc.). In another example, one or more optical sub-lanes may not be needed to transmit data at a certain time, and the remaining optical sub-lanes operate at full speed (e.g., 25 Gbps, etc.). In another example, some or all of the available optical sub-lanes may operate at a lower than maximum speed (e.g., 10 Gbps out of a possible 25 Gbps, etc.). In some examples, some optical sub-lanes may operate at a different speed than other optical sub-lanes. Thus, one optical sub-lane can operate at 10 Gbps (e.g., due to degradation on the optical sub-lane) and another optical sub-lane can operate at 25 Gbps so that the degraded optical sub-lane can at least transmit some data, rather than no data at all.

In certain examples, electrical lanes 414-428, 612-628 operating at a higher bandwidth than the degraded aggregate bandwidth of the optical sub-lanes 450-464, 632-646 can overrun available buffer space for data frames. As a result, a data source can be throttled to avoid buffer overrun in the EOX 208, 210, 300, 402, 404, 602, 604. For example, PAUSE frames can be sent to an electrical transmitter source to delay transmission of another data frame.

FIG. 11 depicts an example frame striping configuration 1100 in which eight data frames 1101-1108 on an electrical lane 1110 are received by an electrical/optical transceiver 1112 and distributed by a lane selector 1114 of the transceiver 1112 among four optical sub-lanes 1116-1119 operating at a lower speed than the electrical lane 1110. In the example of FIG. 11, the lane selector 1114 divides the eight frames 1101-1108 evenly across the four optical sub-lanes 1116-1119 such that each optical sub-lane 1116-1119 is allocated two data frames 1101-1108.

Figure 12:
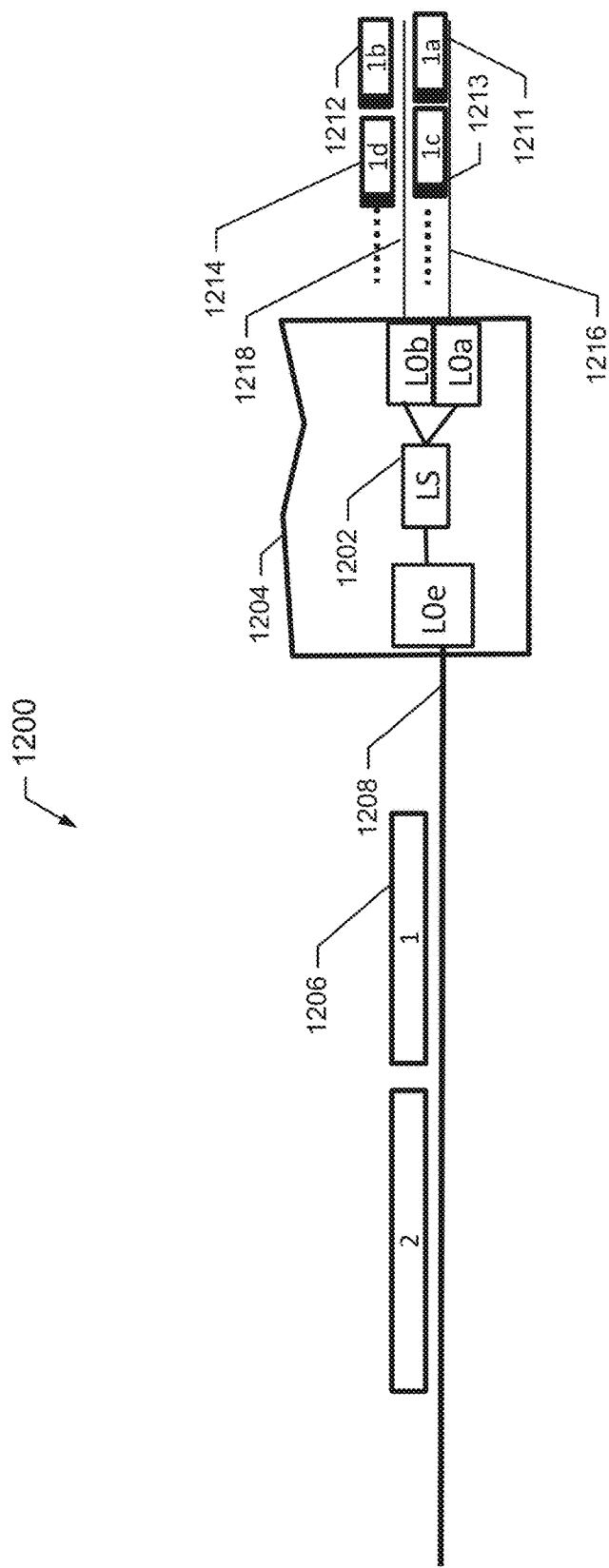
FIG. 12 shows an example byte-striping configuration across two lanes to split each electrical lane into two optical sub-lanes.

As shown in the example of FIG. 12, byte-striping across two lanes splits each electrical lane (e.g., at 50 Gbps) into two optical sub-lanes (e.g., at 25 Gbps). As shown in the example byte-striping configuration 1200 of FIG. 12, a lane selector 1202 of an electrical/optical transceiver 1204 processes a data frame 1206 from an electrical lane 1208 and alternates sending multiple bytes 1211-1214 of the frame 1206 to each of two optical sub-lanes 1216, 1218. As shown in the example of FIG. 12, a first byte 1211 of frame 1206 is routed to optical sub-lane 1216. A second byte 1212 of frame 1206 is routed to optical sub-lane 1218. A third byte 1213 of frame 1206 is routed to optical sub-lane 1216. A fourth byte 1214 of frame 1206 is routed to optical sub-lane 1218. Thus, a number of bits is pushed across each optical sub-lane 1216, 1218 (e.g., a first 8 bits of 50 Gbps goes to optical sub-lane 1216, and a second 8 bits of the 50 Gbps goes to optical sub-lane 1218, etc.) in a time-division multiplexing (TDM) format.

Using byte-striping across two optical sub-lanes, any skews between the two optical sub-lanes 1216, 1218 are deskewed using alignment markers before a data stream is sent to the optical sub-lanes 1216, 1218. For example, on an optical side of the transceiver 1204, lanes are deskewed so that data bytes come out in order on the receive side. For example, in case optical sub-lane 1216 has a slightly higher latency or is longer in length than optical sub-lane 1218, it would not be beneficial to have data in optical sub-lane 1218 passing data in optical sub-lane 1216 if data was provided to the optical sub-lane 1216 first.

If one of the two optical sub-lanes 1216, 1218 experiences a fault, the electro-optical transceiver 1204 can renegotiate (e.g., re-auto-negotiate from 50 Gbps to 25 Gbps) with a source of the electrical data (e.g., a NIC, switch, etc.) for the electrical lane 1208 to operate at a speed equivalent to the operating sub-lane 1216, 1218, which could temporarily disrupt data flow. Alternatively or in addition, the transceiver 1204 can issue PAUSE frames to the electrical data source to throttle the data flow to achieve an effective data rate to be approximately the same as the rate of the operating optical sub-lane 1216, 1218.

Figure 13:
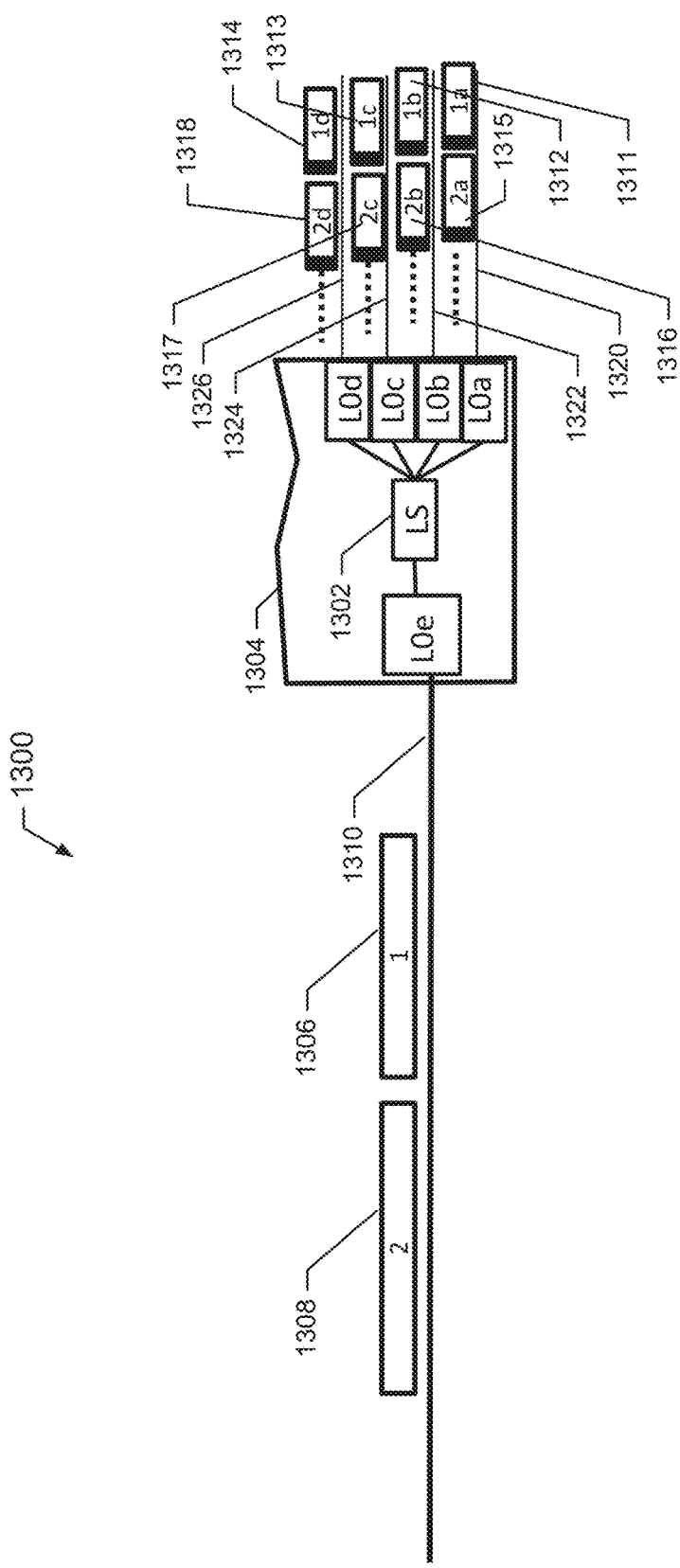
FIG. 13 depicts an example of byte-striping of data that is implemented across more than two optical sub-lanes.

FIG. 13 depicts an example of byte-striping of data that is implemented across more than two optical sub-lanes. As shown in the example of FIG. 13, byte-striping across four optical sub-lanes splits each electrical lane (e.g., at 50 Gbps) across four optical sub-lanes. As shown in the example byte-striping configuration 1300 of FIG. 13, a lane selector 1302 of an electrical/optical transceiver 1304 processes data frames 1306, 1308 from an electrical lane 1310 and alternates sending multiple bytes 1311-1318 of each frame 1306, 1308 to each of four optical sub-lanes 1320-1326. As shown in the example of FIG. 13, a first byte 1311 of frame 1306 is routed to optical sub-lane 1320. A second byte 1312 of frame 1306 is routed to optical sub-lane 1322. A third byte 1313 of frame 1306 is routed to optical sub-lane 1324. A fourth byte 1314 of frame 1306 is routed to optical sub-lane 1326. Similarly, a first byte 1315 of frame 1308 is routed to optical sub-lane 1320. A second byte 1316 of frame 1308 is routed to optical sub-lane 1322, A third byte 1317 of frame 1308 is routed to optical sub-lane 1324, A fourth byte 1318 of frame 1308 is routed to optical sub-lane 1326.

Thus, a number of bits is pushed across each optical sub-lane 1320-1326 in a TOM-style format. Optical sub-lanes 1320-1326 can be used in a round-robin format to split the electrical lane 1310 data stream into byte-multiples. Using more than two optical sub-lanes, wear leveling of the sub-lanes can be facilitated, and, even if one sub-lane is unavailable, a full throughput (e.g., matching 50 Gbps from the electrical lane 1310) can be fulfilled. If multiple sub-lanes (e.g., three of four sub-lanes 1320-1326) are not functional, however, then the electrical data source is paused (e.g., sent PAUSE frames) and auto-negotiated for a lower data rate (e.g., reducing from 50 Gbps to 25 Gbps on the electrical lane 1310, eta).

Using frame encapsulation for data striping, data frames (e.g., Ethernet frames, etc.) are de-constructed from one or more electrical lanes, The data frames are repackaged into smaller "custom" frames and sent over a larger number of optical sub-lanes. Custom frames include sufficient information in their headers (e.g., port number, sequence count, etc.) for the component on the receiving end of the optical cables to reconstruct the original data frames from the custom frames.

Figure 14:
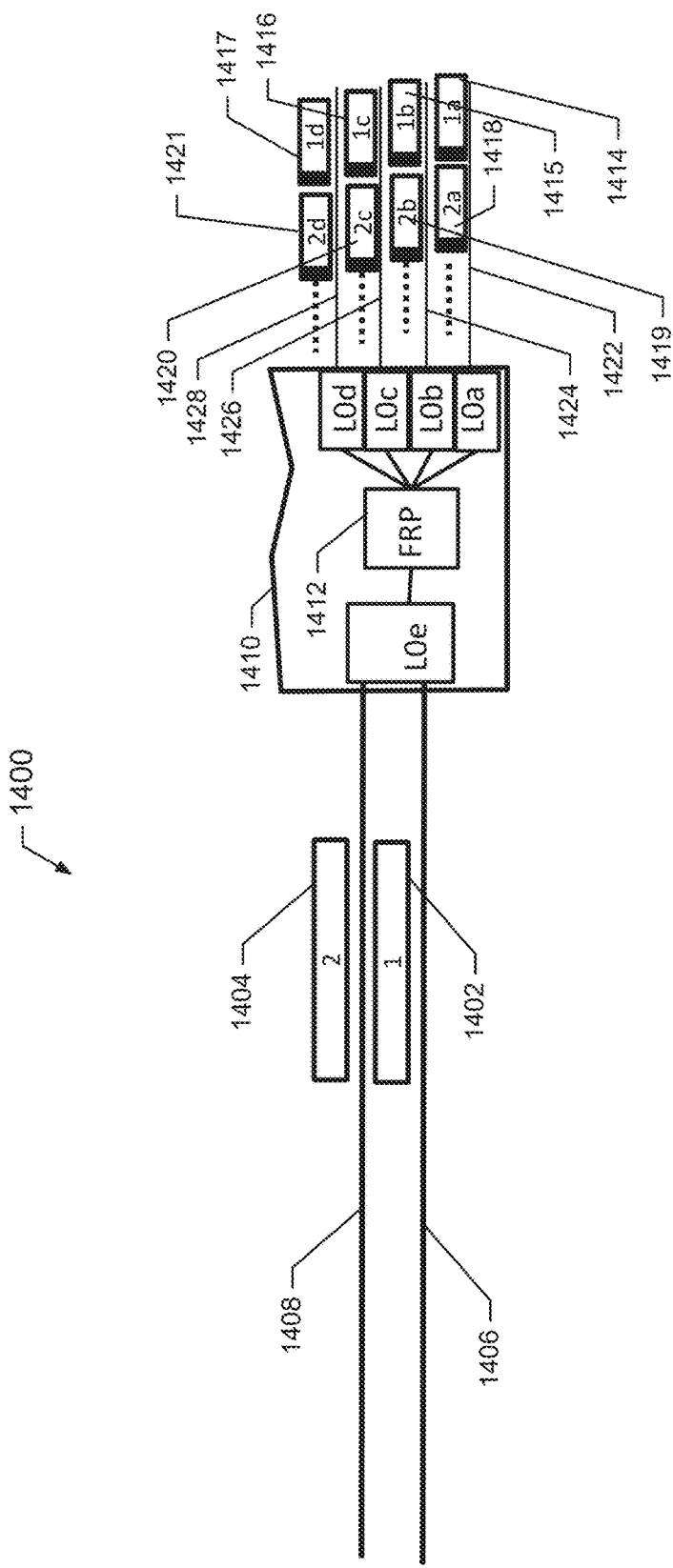
FIG. 14 depicts an example circuit with frame encapsulation for a plurality of data frames on electrical lanes.

For example, FIG. 14 depicts an example circuit 1400 with frame encapsulation for a plurality of data frames 1402, 1404 on electrical lanes 1406, 1408. An electro-optical transceiver 1410 includes a frame repackager 1412 which repackages the frames 1402, 1404 into a plurality of custom frames 1414-1417 and 1418-1421, respectively. The custom frames 1414-1421 are divided among optical sub-lanes 1422-1428, For example, from original frame 1402, custom frame 1414 is routed by the frame repackager 1412 to optical sub-lane 1422. Custom frame 1415 is routed to optical sub-lane 1424. Custom frame 1416 is routed to optical sub-lane 1426. Custom frame 1417 is routed to optical sub-lane 1428. Similarly, from original frame 1404, custom frame 1418 is routed by the frame repackager 1412 to optical sub-lane 1422. Custom frame 1419 is routed to optical sub-lane 1424. Custom frame 1420 is routed to optical sub-lane 1426. Custom frame 1421 is routed to optical sub-lane 1428.

Using frame encapsulation, a flexible mapping can be established between a number of electrical lanes and a number of optical sub-lanes. Additionally, frame header overhead can be better amortized. The flexible arrangement of frame encapsulation also provides a higher level of link resiliency and better load balance (e.g., PAUSE frames may be avoided if one sub-lane goes down since not all electrical lanes will be fully utilized at all times, etc.). All optical sub-lanes can be shared by all electrical lanes. Disadvantages of frame encapsulation include deeper buffers and more complex logic, which can introduce higher latency.

Returning to the example flowchart of FIG. 10, at block 1006, one or more optical sub-lanes are activated based on the determined data routing. For example, pairs of optical lane transceivers 318-332, 466-496, 648-678 arranged in the first and second EOX 208, 210, 300, 402, 404, 602, 604 activate optical sub-lanes 450-464, 632-646 according to the configuration information. For example, as shown in the example of FIGS. 4-7, one or more methods of data striping are applied to split bandwidth from a single electrical lane 414-428, 612-628 to multiple optical sub-lanes 450-464, 632-646

At block 1008, data is transferred via the one or more optical sub-lanes 450-464, 632-646 activated by pairs of optical lane transceivers 318-332, 466-496, 648-678 according to the configuration information. Using the arrangement of optical sub-lanes 450-464, 632-646 with respect to electrical lanes 414-428, 612-628, data can be routed between components, such as NIC 216, 406-412, 612-614; switch 232, 414, 610, and/or other ASIC, for example.

Figure 15:
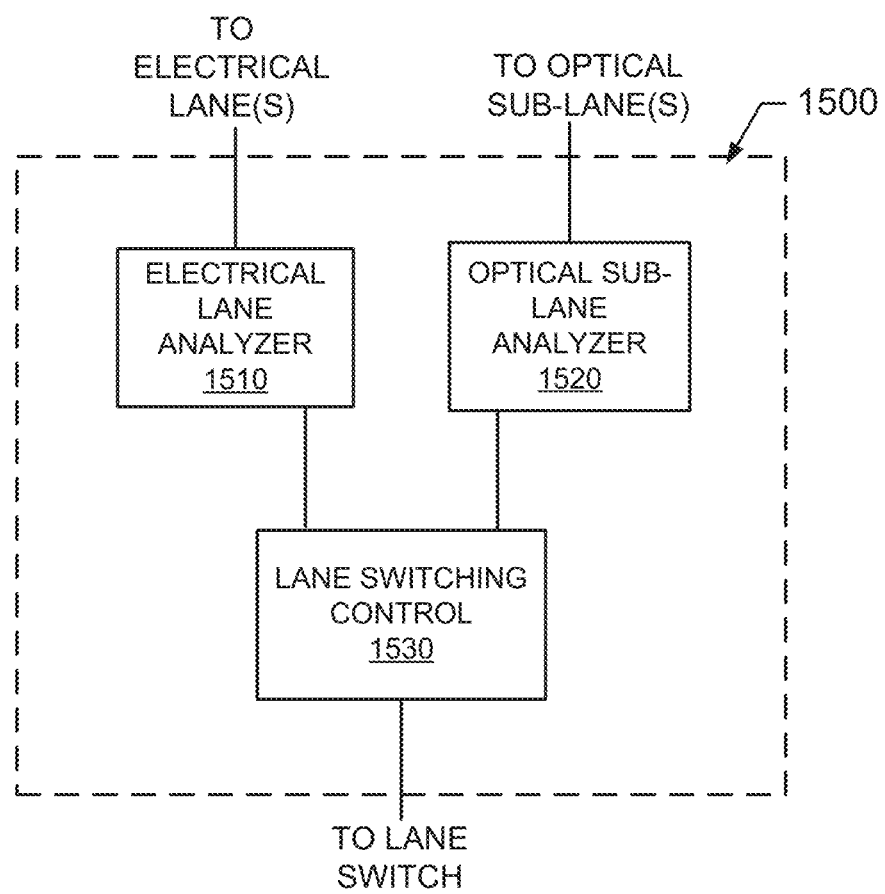
FIG. 15 illustrates a block diagram for an example controller for an electrical/optical transceiver.

FIG. 15 illustrates a block diagram for an example controller 1500 for an electrical/optical transceiver. The example controller 1500 includes an electrical lane analyzer 1510, an optical sub-lane analyzer 1520, a lane switching control 1530. In the example of FIG. 15, the electrical lane analyzer 1510 analyzes incoming and/or outgoing data to/from a component, such as a NIC, switch, other ASIC, etc., and determines a bandwidth usage by that incoming/outgoing data (e.g., 100 Gbps, 50 Gbps, 25 Gbps, etc.). The example optical sub-lane analyzer 1520 measures an operating state of one or more connected optical sub-lanes and indicates a usefulness of each sub-lane in transmitting data to/from an electrical lane (e.g., providing an indication of sub-lane available, sub-lane fault, sub-lane tracked heavily used and due for rotation, etc.).

The lane switching control 1530 receives information from the electrical lane analyzer 1510 and the optical sub-lane analyzer 1520 and determines a data allocation configuration to map each electrical lane to one or more available optical sub-lanes. For example, the lane switching control 1530 instructs a lane switch (e.g., LS 302-308, 498-512, 680-686) inside an electro-optical transceiver (e.g., EOX 208, 210, 300, 402, 404, 602, 604) to implement a data striping configuration (e.g., frame striping, byte striping across two sub-lanes, byte striping across more than two sub-lanes, frame encapsulation, etc.) with respect to data to/from an electrical lane 414-428, 612-618 to/from one or more optical sub-lanes 450-464, 632-646, as described above with respect to FIGS. 10-14.

Figure 16:
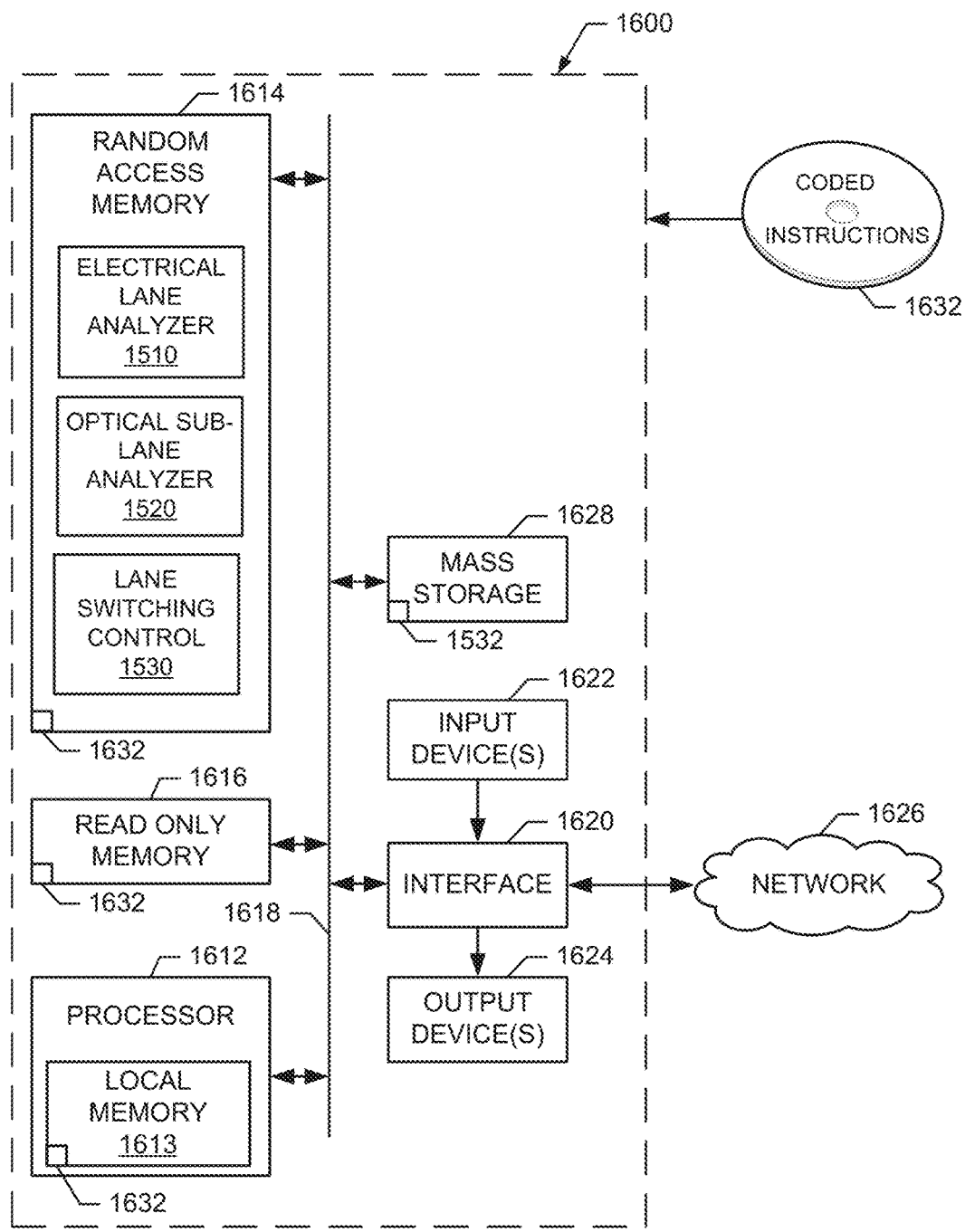
FIG. 16 is a processor platform to execute the instructions of FIGS. 8-10 to implement example controller of FIG. 15 and control operation of the example electrical/optical transceivers and end-to-end link hardware systems of FIGS. 2-7 and 11-14.

FIG. 16 is a processor platform to execute the instructions of FIGS. 8-10 to implement example controller of FIG. 15 and control operation of the example electrical/optical transceivers and end-to-end link hardware systems of FIGS. 2-7 and 11-14. The processor platform 1600 can be, for example, a server, a personal computer, a mobile device (e.g., a cell phone, a smart phone, a tablet such as an iPad™), a personal digital assistant (PDA), an Internet appliance, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors or controllers from any desired family or manufacturer.

The processor 1612 of the illustrated example includes a local memory 1613 (e.g., a cache). The processor 1612 executes the instructions of FIGS. 8-10 to implement the example controller 1500 including the example electrical lane analyzer 1510, the example optical sub-lane analyzer 1520, and the example lane switching control 1530 of FIG. 15. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory and/or clock controller.

The processor platform 1600 of the illustrated example also includes an interface circuit 1620, The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device (s) 1622 permit(s) a user to enter data and commands into the processor 1612, The input device(s) can be implemented by, for example, an audio sensor, a microphone, a keyboard, a button, a light emitting diode (LED), a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by a display device (e.g., a light emitting diode (LED), an organic light emitting diode (OLED), a liquid crystal display, a cathode ray tube display (CRT), etc.), a touchscreen, a tactile output device, an audio output device (e.g., a speaker), and/or a data output device (e.g., a network card, modem, cable, etc.). The interface circuit 1620 of the illustrated example, thus, typically includes a graphics driver card, a graphics driver chip, a graphics driver processor, sound card, audio processor, network communications chip, modem processor, etc.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.).

In certain examples, the processor platform 1600 of the illustrated example also includes one or more mass storage devices 1628 for storing software and/or data. Examples of such mass storage devices 1628 include hard drive disks, compact disk drives, Blu-ray disk drives, RAID systems, and digital versatile disk (DVD) drives. In other examples, the processor platform 1600 is implemented as an embedded microcontroller executing programed stored as firmware in non-volatile memory 1616. For example, the coded instructions 1632 of FIGS. 8-10 may be stored in the mass storage device 1628, in the volatile memory 1614, in the non-volatile memory 1616, and/or on a removable tangible computer readable storage medium such as a CD or DVD.

As disclosed above, the processor platform 1600 can implemented as an embedded microcontroller executing a program of instructions stored as firmware in non-volatile memory 1616. In certain examples, instructions cause the processor to form a state machine to accommodate a data transmission speed over an electrical link using a plurality of available optical links. In certain examples, the state machine is formed on a transceiver (or its included lane switch(es)). In other examples, the state machine is formed on a controller in communication with the transceiver (and/or its lane switch(es)).

From the foregoing, it will be appreciated that the above disclosed method, apparatus, and articles of manufacture provide optical links with elastic bandwidth and resiliency for dynamically adaptable end-to-end link bandwidth and reliability. Using examples disclosed herein, multiple lower-speed optical sub-lanes can be used to accommodate data from a higher-speed electrical lane. In one example, two 25 Gbps vertical-cavity surface-emitting lasers (VCSELs) can be used over two optical sub-channels to convert one 50 Gbps pulse-amplitude modulated (PAM, such as PAM4 modulation, etc.) electrical transmit channel.

In some examples, the use of optical sub-lanes can be reduced when some optical sub-lanes are impaired, or the electrical lanes warrant significantly less than their maximum bandwidth. For example, when all available optical sub-lanes are functioning but less than fifty percent of the available bandwidth is being used on the electrical lanes, an optical transceiver can turn off half of its optical sub-lanes for lower power consumption, while still accommodating the data from the electrical lanes. In addition, certain examples rotate use of available optical sub-lanes (e.g., by wear-leveling, etc.), so optical lasers will have longer operating life and enhanced system reliability.

When one of two optical components fails in an end-to-end link, certain examples allow degraded bandwidth over the functioning optical sub-lane and disables or turns off the impaired optical sub-lane, resulting in a more resilient end-to-end link providing improved service availability over an optical cable connected between two network ports.

Conventional systems and methods to provide an end-to-end link between components used an equal number of electrical lanes and optical lanes. Additionally, a data rate of the electrical lanes had to be reduced to match the same data rate as the optical lanes (or have lower data rates than the optical lanes). Examples disclosed herein alleviate such problems by utilizing a plurality of optical sub-lanes for each electrical lane and by providing multiple optical signal wavelengths for link resiliency, transceiver wear leveling, and/or power conservation. In certain examples, multiple wavelengths are transported in each physical fiber for coarse wavelength division multiplexing (CWDM) and/or dense wavelength division multiplexing (DWDM) optical transceivers to reduce or minimize unused fiber when not all wavelengths are used.

Example methods and apparatus are disclosed to implement an electrical/optical transceiver to facilitate data transfer between circuits. Such an example apparatus includes an electrical transceiver lane to transfer data at a first bandwidth over an electrical link. The example apparatus also includes a plurality of optical transceiver sub-lanes to transfer data over an optical link. The example apparatus also includes a lane switch to dynamically map the electrical transceiver lane to the plurality of optical transceiver sub-lanes based on an analysis of the first bandwidth and the plurality of optical transceiver sub-lanes to accommodate the first bandwidth with at least a subset of the plurality of optical transceiver sub-lanes to transfer data between the electrical link and the optical link.

Examples are disclosed to implement an apparatus including a lane switch. The example lane switch is configured to receive an analysis of a first bandwidth associated with an electrical lane. The example lane switch is configured to receive a measure of an operating state of a plurality of optical sub-lanes. The example lane switch is configured to dynamically route data between the electrical lane and the plurality of optical sub-lanes based on the analysis of the first bandwidth associated with the electrical lane and the measure of the operating state of the plurality of optical sub-lanes.

Examples are disclosed to implement a machine readable medium including instructions that, when executed, cause a machine to analyze a first bandwidth usage on an electrical lane to a component. The example instructions, when executed, also cause the machine to measure an operating state of a plurality of optical sub-lanes. The example instructions, when executed, also cause the machine to determine a data routing between the electrical lane and the plurality of optical sub-lanes based on the first bandwidth usage and the operating status of the plurality of optical sub-lanes. The example instructions, when executed, also cause the machine to facilitate data transfer between the electrical lane and the plurality of optical sub-lanes according to the data routing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An electrical/optical transceiver apparatus comprising:
   an electrical transceiver lane to transfer data at a first bandwidth over an electrical link;
   a plurality of optical transceiver sub-lanes to transfer data over an optical link;
   a lane switch to dynamically map the electrical transceiver lane to the plurality of optical transceiver sub-lanes based on an analysis of the first bandwidth and the plurality of optical transceiver sub-lanes to accommodate the first bandwidth with at least a subset of the plurality of optical transceiver sub-lanes to transfer data between the electrical link and the optical link, wherein the lane switch is to rotate among the plurality of optical transceiver sub-lanes to accommodate the first bandwidth.

2. The apparatus of claim 1, wherein the electrical/optical transceiver apparatus forms an end-to-end link with a second electrical/optical transceiver having a second electrical lane transceiver and a second plurality of optical transceiver sub-lanes, the plurality of optical transceiver sub-lanes and second plurality of optical transceiver sub-lanes forming the optical link to transfer data.

3. The apparatus of claim 1, wherein the lane switch is to adjust a combination of the plurality of optical transceiver sub-lanes accommodating data from the electrical transceiver lane based on a fault associated with at least one of the plurality of optical transceiver sub-lanes.

4. The apparatus of claim 1, wherein the lane switch is to adjust a combination of the plurality of optical transceiver sub-lanes accommodating data from the electrical transceiver lane based on a degradation of the first bandwidth.

5. The apparatus of claim 1, wherein the plurality of optical transceiver sub-lanes includes at least one of two optical transceiver sub-lanes or four optical transceiver sub-lanes.

6. An electrical/optical transceiver apparatus comprising:
an electrical transceiver lane to transfer data at a first bandwidth over an electrical link:
a plurality of optical transceiver sub-lanes to transfer data over an optical link;
a lane switch to dynamically map the electrical transceiver lane to the plurality of optical transceiver sub-lanes based on an analysis of the first bandwidth and the plurality of optical transceiver sub-lanes to accommodate the first bandwidth with at least a subset of the plurality of optical transceiver sub-lanes to transfer data between the electrical link and the optical link, wherein the lane switch is to direct a data frame from the electrical transceiver lane to one of the plurality of optical transceiver sub-lanes using a sub-lane index in a header of the data frame.

7. An electrical/optical transceiver apparatus comprising:
an electrical transceiver lane to transfer data at a first bandwidth over an electrical link;
a plurality of optical transceiver sub-lanes to transfer data over an optical link;
a lane switch to dynamically map the electrical transceiver lane to the plurality of optical transceiver sub-lanes based on an analysis of the first bandwidth and the plurality of optical transceiver sub-lanes to accommodate the first bandwidth with at least a subset of the plurality of optical transceiver sub-lanes to transfer data between the electrical link and the optical link, wherein the lane switch is to route data between the electrical transceiver lane and the plurality of optical transceiver sub-lanes based on a data striping configuration, the data striping configuration includes at least one of frame striping, byte striping, or frame encapsulation.

8. An apparatus comprising:
a lane switch configured to:
receive an analysis of a first bandwidth associated with an electrical lane;
receive a measure of an operating state of a plurality of optical sub-lanes; and
dynamically route data between the electrical lane and the plurality of optical sub-lanes based on the analysis of the first bandwidth associated with the electrical lane and the measure of the operating state of the plurality of optical sub-lanes, wherein the lane switch is to route data between the electrical lane and the plurality of optical sub-lanes based on a data striping configuration, the data striping configuration includes at least one of frame striping, byte striping, or frame encapsulation.

9. The apparatus of claim 8, wherein the lane switch is included in a first electrical/optical transceiver apparatus including a first plurality of optical sub-lanes forming an end-to-end link with a second electrical/optical transceiver having a second plurality of optical sub-lanes, the first plurality of optical sub-lanes and second plurality of optical sub-lanes forming an optical link to transfer data.

10. The apparatus of claim 8, wherein the lane switch is to adjust a combination of the plurality of optical sub-lanes accommodating data from the electrical lane based on a fault associated with at least one of the plurality of optical sub-lanes.

11. The apparatus of claim 8, wherein the lane switch is to adjust a combination of the plurality of optical sub-lanes accommodating data from the electrical lane based on a degradation of the first bandwidth.

12. An apparatus comprising:
a lane switch configured to:
receive an analysis of a first bandwidth associated with an electrical lane;
receive a measure of an operating state of a plurality of optical sub-lanes; and
dynamically route data between the electrical lane and the plurality of optical sub-lanes based on the analysis of the first bandwidth associated with the electrical lane and the measure of the operating state of the plurality of optical sub-lanes, wherein the lane switch is to rotate among the plurality of optical sub-lanes to accommodate the first bandwidth.

* * * * *